US012349660B2

(12) United States Patent
Nytko et al.

(10) Patent No.: US 12,349,660 B2
(45) Date of Patent: Jul. 8, 2025

(54) ELECTRICAL STIMULUS DEVICE, SUCH AS AN ANIMAL COLLAR, AND VARIABLE PULSE STIMULATION CIRCUIT

(71) Applicant: Radio Systems Corporation, Knoxville, TN (US)

(72) Inventors: Robert A. Nytko, Knoxville, TN (US); Brent Andrew Goetzl, Orinda, CA (US); Nicholas D. Renecle, Knoxville, TN (US)

(73) Assignee: RADIO SYSTEMS CORPORATION, Knoxville, TN (US)

( * ) Notice: Subject to any disclaimer, the term of this patent is extended or adjusted under 35 U.S.C. 154(b) by 16 days.

(21) Appl. No.: 18/469,998

(22) Filed: Sep. 19, 2023

(65) Prior Publication Data
US 2024/0156063 A1    May 16, 2024

Related U.S. Application Data

(60) Provisional application No. 63/424,697, filed on Nov. 11, 2022.

(51) Int. Cl.
*A01K 27/00* (2006.01)
(52) U.S. Cl.
CPC .......... *A01K 27/009* (2013.01); *A01K 27/001* (2013.01)
(58) Field of Classification Search
CPC .... A01K 27/009; A01K 27/001; A44B 11/06; A44B 11/00
See application file for complete search history.

(56) References Cited

U.S. PATENT DOCUMENTS

| 3,998,459 | A | 12/1976 | Henderson et al. |
| 5,467,508 | A * | 11/1995 | Feng ..................... A44B 11/06 24/191 |
| 6,003,474 | A | 12/1999 | Slater et al. |
| 6,327,999 | B1 | 12/2001 | Gerig |
| 6,415,742 | B1 | 7/2002 | Lee et al. |
| 6,830,014 | B1 | 12/2004 | Lalor |
| 7,267,082 | B2 * | 9/2007 | Lalor .................... A01K 15/021 119/859 |
| 8,402,924 | B2 | 3/2013 | Pacheco et al. |

(Continued)

OTHER PUBLICATIONS

Notice of Allowance issued in copending U.S. Appl. No. 18/469,977 on Sep. 11, 2024.

(Continued)

*Primary Examiner* — Kristen C Hayes

(57) ABSTRACT

An animal collar includes a collar portion including a housing portion and a plurality of extension portions. Each extension portion can include an insert having a snap receiver aperture extending through the extension portion, as well as a strap receiver having a strap insertion slot and a snap fitting. The snap fitting includes a cap retention slot and one or more snap extensions positioned to engage an interior circumferential ridge of the snap receiver aperture when the snap fitting is inserted into the snap receiver aperture from the first side. The extension portion further includes a retention cap insertable into the snap receiver aperture from the second side and including at least one cap retention extension mateable with the cap retention slot and at least one cap extension positioned adjacent the one or more snap extensions.

20 Claims, 20 Drawing Sheets

(56) References Cited

U.S. PATENT DOCUMENTS

| | | | |
|---|---|---|---|
| 2006/0112905 A1* | 6/2006 | Lalor | A01K 27/009 119/859 |
| 2006/0169222 A1 | 8/2006 | Gerig | |
| 2007/0204804 A1 | 9/2007 | Swanson et al. | |
| 2007/0221141 A1 | 9/2007 | Reinhart | |
| 2007/0227465 A1 | 10/2007 | Gerig et al. | |
| 2010/0139575 A1 | 6/2010 | Duncan et al. | |
| 2011/0220034 A1 | 9/2011 | Frebel et al. | |
| 2013/0112153 A1 | 5/2013 | So et al. | |
| 2013/0233252 A1 | 9/2013 | Bellon et al. | |
| 2015/0040839 A1 | 2/2015 | Goetzl et al. | |
| 2018/0153138 A1 | 6/2018 | Goetzl et al. | |
| 2021/0127640 A1 | 5/2021 | Tarbutton et al. | |
| 2021/0219523 A1 | 7/2021 | So | |
| 2022/0151207 A1* | 5/2022 | Mott | A01K 29/005 |

OTHER PUBLICATIONS

International Search Report and Written Opinion for PCT/US2023/079526, mailed Feb. 28, 2024.

\* cited by examiner

ELECTRICAL STIMULUS DEVICE, SUCH AS AN ANIMAL COLLAR, AND VARIABLE PULSE STIMULATION CIRCUIT

CROSS-REFERENCE TO RELATED APPLICATIONS

The present application claims priority from U.S. Provisional Patent Application No. 63/424,697, filed on Nov. 11, 2022, the disclosure of which is hereby incorporated by reference in its entirety.

BACKGROUND

Collar-mountable systems providing delivery of electrical stimulus are often used for animal behavioral encouragement. Typically, such electrical stimulus is delivered using a pair of stimulus probe contacts, and consists of a signal having a particular energy level represented by a voltage and current for a predetermined duration. The magnitude of that electrical stimulus may be adjustable according to the desired level of stimulus to be provided (e.g., based on a size of the animal and/or sensitivity of responsiveness of that animal).

To create a desired electrical stimulus, it is common for a stimulation circuit that uses a flyback transformer to generate a stimulus signal. The flyback transformer may be operated in a discontinuous mode, creating a flyback pulse at some rate to create an appropriate electrical stimulus to provide an effective correction signal. Based on the manner of selection of components and adjustment of the electrical stimulus signal via the circuit, a magnitude of the electrical stimulus is typically directly related to the physical and electrical characteristics of the flyback transformer that is used. A larger transformer device can typically allow for development of greater energy levels, especially when energized over a longer period of time, and can create a more intense corrective signal. Such a signal may be required to accommodate various attenuating factors, such as the quality of coupling to the animal's skin, an individual stimulus response threshold of the animal, an animal's temperament, and behavior breaking factors. However, such a larger device may add size, weight, and power consumption to an overall stimulus circuit. Furthermore, the stimulus signal generated by such a device may be of variable quality (e.g., repeatability). Additionally, in such a device, intensity of the corrective signal is primarily a result of increased voltage or energy output that is associated with a stimulation signal. Accordingly, improvements in circuits for providing electrical stimulus in this context are desired.

SUMMARY

Generally speaking, the present application is directed to a variable pulse stimulation circuit, as well as a stimulus device including such a stimulation circuit. In example implementations, the variable pulse stimulation circuit can include a transformer configured to receive an input signal and energize in response thereto. In some instances, the transformer is energized using a burst of pulses, rather than individual pulses. A flyback transformer may be selected such that it reaches a saturation mode more quickly, and variations among stimulus patterns may be controlled by a number and timing of pulses within a burst, rather than relying on the magnitude and/or duration of a pulse alone to charge the flyback transformer to a particular state within a linear region or to saturation of the transformer response. This allows for smaller transformers with potentially lower energy saturation levels to be selected for use within a stimulation circuit, which may result in improved compactness and efficiency.

In a first aspect, an electrical stimulus device includes a plurality of stimulus contacts including at least a first stimulus contact and a second stimulus contact. The device further includes an energy source and an electrical stimulation circuit. The electrical stimulation circuit includes a transformer having a primary side and a secondary side, the flyback transformer being connected to the energy source at the primary side, and the secondary side having a first connection and a second connection, wherein the first connection of the secondary side is electrically connected to the first stimulus contact and the second connection of the secondary side is electrically connected to the second stimulus contact. The electrical stimulation circuit further includes an electrically-operable switch connected at the primary side of the transformer, the electrically-operable switch having a control input useable to actuate the electrically-operable switch to impart an electrical stimulus at the first and second stimulus contacts, a diode electrically connected between the secondary side of the transformer and the first stimulus contact and a capacitor electrically connected across the first connection and the second connection of the secondary side of the transformer. The electrical stimulus device includes a controller communicatively connected to the control input, the controller being configured to generate an electrical stimulus event at the plurality of stimulus contacts by outputting, to the control input of the electrical stimulation circuit, a stimulus signal pattern.

In a second aspect, an electrical stimulation system including an electrical stimulation circuit is provided that includes a transformer having a primary side and a secondary side, the primary side having a first connection and a second connection, the first connection being connected to an energy source, the secondary side having a first connection and a second connection, wherein the first connection of the secondary side is electrically connected to a first stimulus output connection and the second connection of the secondary side is electrically connected to a second stimulus output connection. The system further includes an electrically-operable switch connected between the second connection of the primary side of the transformer and a ground connection, the electrically-operable switch having a control input useable to actuate the electrically-operable switch between an open position in which the second connection of the primary side of the transformer is disconnected from ground and a closed position in which the second connection of the primary side of the transformer is connected to ground, a diode electrically connected between the first connection of the secondary side of the flyback transformer and the first stimulus output, and a capacitor electrically connected across the first connection and the second connection of the secondary side of the transformer. The transformer is operable to be energized in response to a pulse sequence received at the control input of the electrically-operable switch comprising a plurality of pulses, and a pulse duration of at least some of the plurality of pulses within the burst period operate to charge the transformer to a saturation mode via the energy source.

In a third aspect, a method of delivering electrical stimulus to an animal is provided. The method includes determining whether to deliver an electrical stimulus to an animal based, at least in part, on an indicator of a condition received at a controller of an electrical stimulus device. The method further includes, in response to determining to deliver the electrical stimulus, generating an electrical stimulus event at the controller in accordance with a preselected stimulus mode. The method also includes, at an electrical stimulation circuit operatively connected to the controller, generating, in response to each of the plurality of pulses, a stimulus signal output from a transformer, the stimulus signal output being electrically provided at a plurality of stimulus contacts positioned to contact a skin surface of an animal, the plurality of stimulus contacts including a first stimulus contact and a second stimulus contact. The electrical stimulation circuit includes a diode electrically connected between the transformer and the first stimulus contact and a capacitor electrically connected across the first stimulus contact and the second stimulus contact.

In a further aspect, an electrical stimulus device includes a housing, a plurality of stimulus contacts including at least a first stimulus contact and a second stimulus contact, and an energy source maintained within the housing. The electrical stimulus device further includes a controller having a plurality of programmable stimulus modes and an electrical stimulation circuit. The electrical stimulation circuit includes a flyback transformer having a primary side and a secondary side, the primary side having a first connection and a second connection, the first connection being connected to the energy source, the secondary side having a first connection and a second connection, wherein the first connection of the secondary side is electrically connected to the first stimulus contact and the second connection of the secondary side is electrically connected to the second stimulus contact. The electrical stimulation circuit further includes an electrically-operable switch connected between the second connection of the primary side of the flyback transformer and a ground connection, the electrically-operable switch having a control input useable to actuate the electrically-operable switch between an open position in which the second connection of the primary side of the flyback transformer is disconnected from ground and a closed position in which the second connection of the primary side of the flyback transformer is connected to ground. The controller is communicatively connected to the control input, the controller being configured to generate an electrical stimulus event at the plurality of stimulus contacts by outputting, to the control input of the electrical stimulation circuit, a stimulus signal pattern in accordance with a selected stimulus mode from among a plurality of stimulus modes. Each of the plurality of stimulus modes includes a definition of a packet, wherein each packet defines a duty cycle including one or more pulse burst periods, each pulse burst period including a plurality of pulses.

In a further aspect, an electrical stimulation system including an electrical stimulation circuit is disclosed. The electrical stimulation system includes a flyback transformer having a primary side and a secondary side, the primary side having a first connection and a second connection, the first connection being connected to an energy source, the secondary side having a first connection and a second connection, wherein the first connection of the secondary side is electrically connected to a first stimulus output connection and the second connection of the secondary side is electrically connected to a second stimulus output connection. The electrical stimulation system further includes an electrically-operable switch connected between the second connection of the primary side of the flyback transformer and a ground connection, the electrically-operable switch having a control input useable to actuate the electrically-operable switch between an open position in which the second connection of the primary side of the flyback transformer is disconnected from ground and a closed position in which the second connection of the primary side of the flyback transformer is connected to ground. The electrical stimulation system further includes a diode electrically connected between the first connection of the secondary side of the flyback transformer and the first stimulus output, and a capacitor electrically connected across the first connection and the second connection of the secondary side of the flyback transformer. The flyback transformer is operable to be energized in response to a pulse sequence received at the control input of the electrically-operable switch comprising a plurality of pulses occurring within a burst period, wherein each pulse corresponds to a flyback event of the flyback transformer. A pulse duration of each pulse operates to charge the flyback transformer up to and including saturation of the transformer device via the energy source.

In a yet further aspect, a method of delivering electrical stimulus to an animal is disclosed. The method includes determining whether to deliver an electrical stimulus to an animal, based, at least in part, on an indicator of a condition received at a controller of an electrical stimulus device. In response to determining to deliver the electrical stimulus, the method includes generating an electrical stimulus event at the controller in accordance with a preselected stimulus mode. The electrical stimulus event includes one or more packets, each packet defining a duty cycle including a burst period and an inactivity period, wherein the burst period includes a plurality of constant-duration pulses. The method further includes, at an electrical stimulation circuit operatively connected to the controller, generating, in response to each of the plurality of constant-duration pulses, a corresponding stimulus signal output from a flyback transformer to a plurality of stimulus contacts positioned to contact a skin surface of an animal.

In a still further aspect, an animal collar includes a collar portion including a housing portion and a plurality of extension portions. Each extension portion can include an insert received at an end of the extension portion and including a snap receiver aperture having an interior circumferential ridge, the snap receiver aperture extending through the extension portion from a first side to a second side, as well as a strap receiver having a strap insertion slot and a snap fitting. The snap fitting includes a cap retention slot and one or more snap extensions positioned to engage the interior circumferential ridge of the snap receiver aperture when the snap fitting is inserted into the snap receiver aperture from the first side. The extension portion further includes a retention cap insertable into the snap receiver aperture from the second side, the retention cap including at least one cap retention extension mateable with the cap retention slot and at least one cap extension positioned adjacent the one or more snap extensions, and on an opposite side of the one or more snap extensions from the interior circumferential ridge.

In a yet further aspect, an animal collar is provided. The animal collar includes a housing portion having a front side and a rear side, the housing portion enclosing an electrical stimulation circuit and including a plurality of stimulus contacts exposed at the rear side. The animal collar further includes a plurality of extension portions including a first extension portion and a second extension portion extending from opposite lateral sides of the housing portion. Each of the first extension portion and the second extension portion includes: a wing portion extending from and integrally formed with the housing portion; an insert received at an end of the wing portion and including a snap receiver aperture extending through the wing portion from a first side toward a second side; a strap receiver having a strap insertion slot and a snap fitting, the strap receiver being insertable at the first side of the snap receiver aperture; and a retention cap insertable into the snap receiver aperture from the second side and mateable with the strap receiver within the snap receiver aperture.

DETAILED DESCRIPTION

Figure 1:
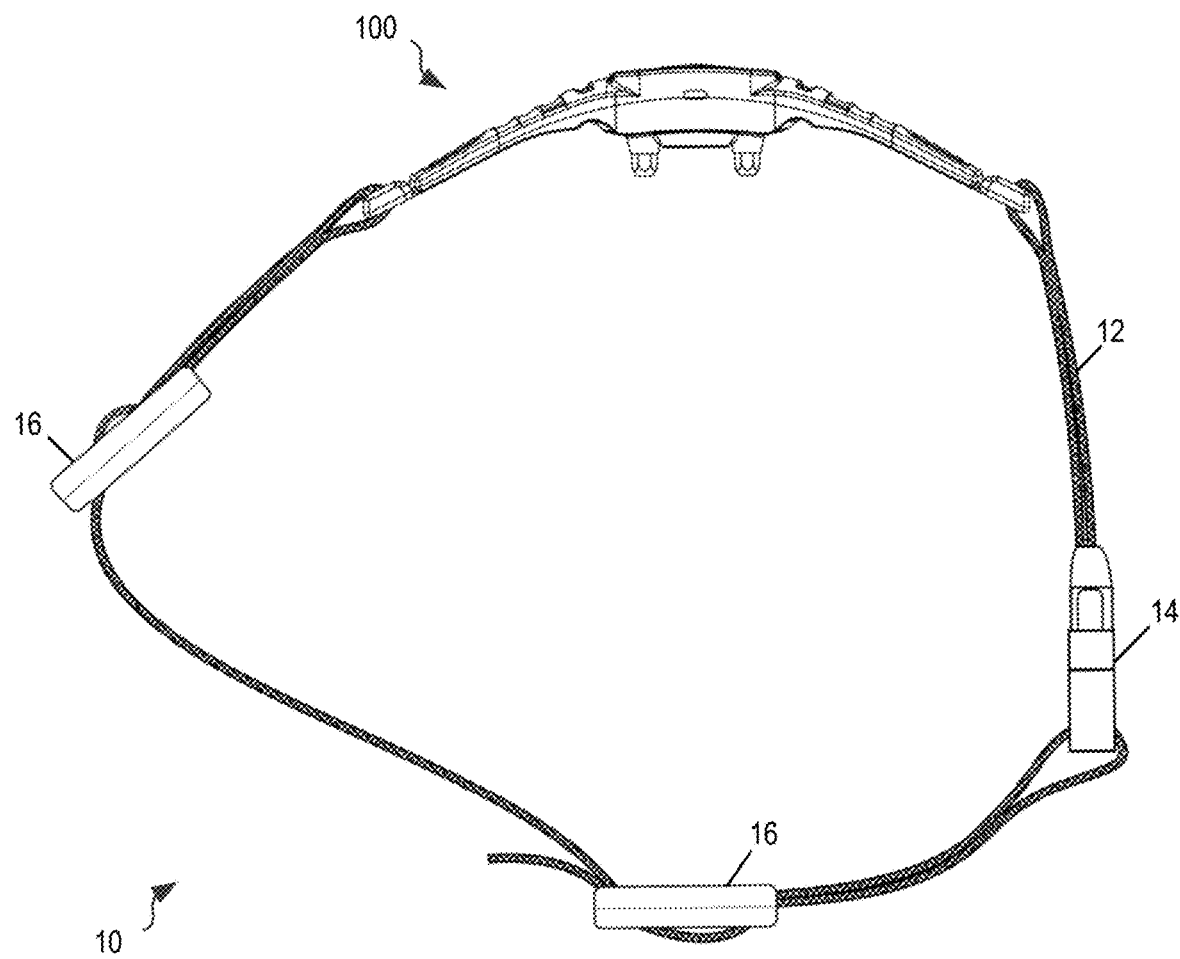
FIG. 1 illustrates a perspective view of an animal collar in which aspects of the present disclosure may be implemented.

As briefly described above, embodiments of the present invention are directed to a stimulus device, such as may be used in an animal collar. The stimulus device may have a body portion that includes a housing portion and extension portions extending from opposite sides of the housing portion. The extension portions may form a retention arrangement usable to affix a strap to the stimulus device, thereby forming the animal collar. The retention arrangement allows for secure attachment of a removable/replaceable strap component that can be used to retain the stimulus device in a desired location adjacent an animal's skin, to ensure proper stimulus may be applied. Each extension portion may include a wing portion extending from the housing portion, as well as an insert having a snap retention aperture, a strap retention housing including a strap receiver, and a retention cap. The snap retention aperture cooperates with the strap retention housing and the retention cap to securely retain the strap receiver to the wing portion, while enabling interchangeability of the strap receiver in the event of wear or damage.

In some implementations, the stimulus device may include a variable pulse stimulation circuit. In example implementations, the variable pulse stimulation circuit can include a transformer, such as a flyback transformer, to receive an input signal and energize in response thereto. In some instances, the flyback transformer is energized using a burst of pulses, rather than individual pulses. A flyback transformer may be selected such that it reaches a saturation mode more quickly, and variations among stimulus patterns may be controlled by a number, timing, and duty cycle of pulses within a burst, rather than relying on the magnitude and/or duration of a pulse alone to charge the flyback transformer to a particular state within a linear region or saturation of the transformer response.

By way of reference, in a traditional stimulation device, a series of pulses are output by a control circuit. Each pulse may actuate a switch that delivers a voltage across a primary side of a flyback transformer. During the period of time of the pulse (i.e., the pulse width), the switch will remain closed, and the voltage across the primary side of the flyback transformer will be maintained. During this time, the flyback transformer is energized. That energy is subsequent discharged on the secondary side of the transformer to stimulus contacts once the voltage is no longer applied across the primary side of the flyback transformer (e.g., at the end of the pulse). To adjust the intensity of the signal delivered to the stimulus contacts, the amount of time voltage is applied across the primary side of the flyback transformer can be adjusted. An increased amount of time during which the pulse remains active results in an increased stimulus signal delivered on the secondary side of the flyback transformer. Since the flyback transformer is operating within a linear response region, the length of time of the pulse may be adjusted up to the point of saturation of the flyback transformer, at which point the transformer is saturated (can store no further charge), and the maximum output pulse of the transformer may be reached. The saturation point of the flyback transformer is therefore generally viewed as the operating limit of adjustability of such a stimulation circuit.

Pulses in such a device may be included within a stimulation "packet" representing a number of pulses, with each pulse separated by a period of inactivity, and each packet separated from other packets by periods of inactivity. A particular stimulation event may be constructed including packets and respective inactivity periods that match a desired operational scheme of the device, typically (as noted above) by adjusting the duration of each pulse.

The present application describes an improved manner in which pulses are output from a control circuit, alongside an adjustment to the electrical stimulation circuit at which such pulses are received. In such an arrangement, an individual pulse, corresponding to a single switching to deliver voltage to the flyback transformer and a corresponding flyback event, can be included within a "burst" of flyback events occurring over a relatively short period of time. This burst of flyback events may include up to 100 or more pulses, with corresponding flyback events. A packet may be created, constructed from bursts of pulses (rather than individual pulses) separated by periods of inactivity, typically on the order of 4-20 mS, and in some instances, on the order of 1-30 mS, or greater than 30 mS (e.g., up to 1, 10, or 60 seconds between packets and/or stimulation events). Stimulation events, in this context, may be constructed from packets and inactivity periods that match a desired operational scheme of the device.

By contrast to the traditional circuit and construction, the "burst" of flyback pulses within a particular period allows a potential additional vector of control and variability, since the multiple pulses within a burst take the place of a single pulse in a traditional stimulus signal. Additionally, the specific stimulus signal to be applied may be varied with great refinement based on the number of pulses within a burst. The intensity of feeling of the stimulus is associated with the amount of pulses within the burst and the timing characteristics between such pulses, rather than reliance on the amplitude and energy of a given pulse alone. Furthermore, by switching from reliance on the amplitude and energy of an individual pulse to use of multiple timed pulses within burst and packet periods, there does not need to be such adjustability as to signal output amplitude. For that reason, a large flyback transformer that operates within a linear response region is not required, and instead a much smaller charge capacity flyback transformer may be used up to and within its saturation region. That is, adjustability of signal intensity is not reliant solely on the linear response of transformer signal output but instead is also based on the number, timing, and intensity of pulses within a given "burst" within a signaling packet.

Because the signaling method and circuit components may be adjusted in accordance with principles of the present disclosure, a number of advantages are obtained. For example, use of smaller flyback transformers with lower energy saturation levels within a stimulation circuit may result in improved compactness and efficiency. This reduces the weight and size of the circuit device, allowing it to be packaged within a smaller housing. Such a smaller housing may be more convenient for animals of all sizes, and in particular smaller animals.

I. Example Mechanical Implementations Utilizing Stimulation Circuit

Referring to FIGS. 1-12, an animal collar 10 is illustrated, including a portion 100 useable to retain the stimulus device described below, as well as a flexible strap portion 12. The portion 100 may be constructed, either in part or in whole, from an environmentally-protective material, such as a ruggedized plastic and/or rubber material, for example a thermoplastic urethane (TPU) material. The flexible strap portion 12 may be constructed from a plastic or fabric material, and is generally constructed to be sufficiently flexible and/or adjustable in size as to affix the animal collar 10 around a neck of an animal such that the portion 100 is retained against the skin of the animal. In example implementations, the flexible strap portion 12 may be constructed at least in part from a weather-resistant material such as nylon fabric, and may include one or more clasps 14 or adjustment loops 16 thereon to adjust a length of the flexible strap portion (and therefore the overall circumferential size) of the animal collar 10.

Figure 2:
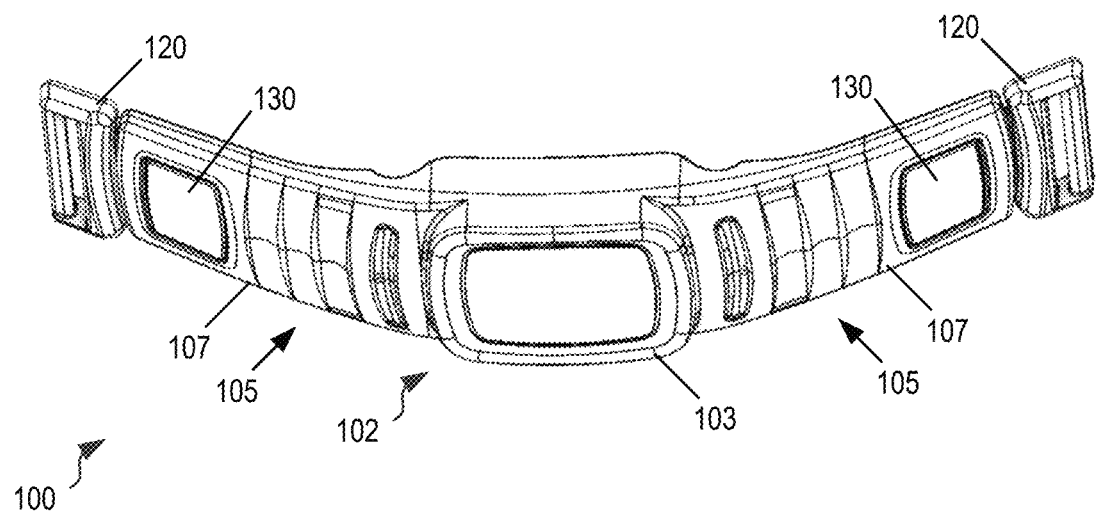
FIG. 2 illustrates an example front perspective view of a portion of the animal collar of FIG. 1.
Figure 3:
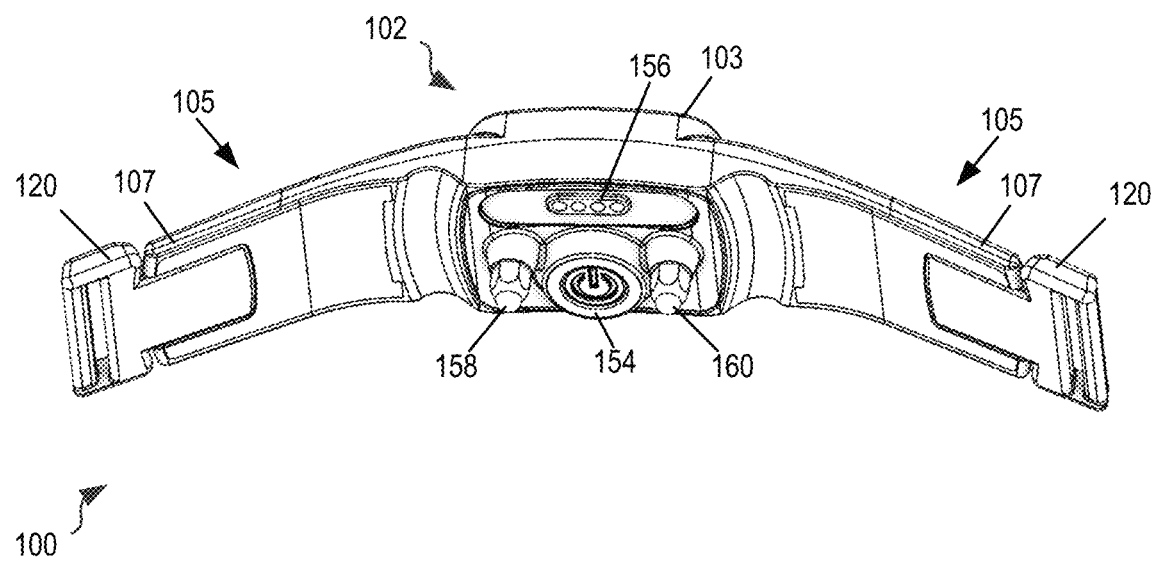
FIG. 3 is a rear perspective view of the portion of an animal collar shown in FIG. 1.
Figure 4:
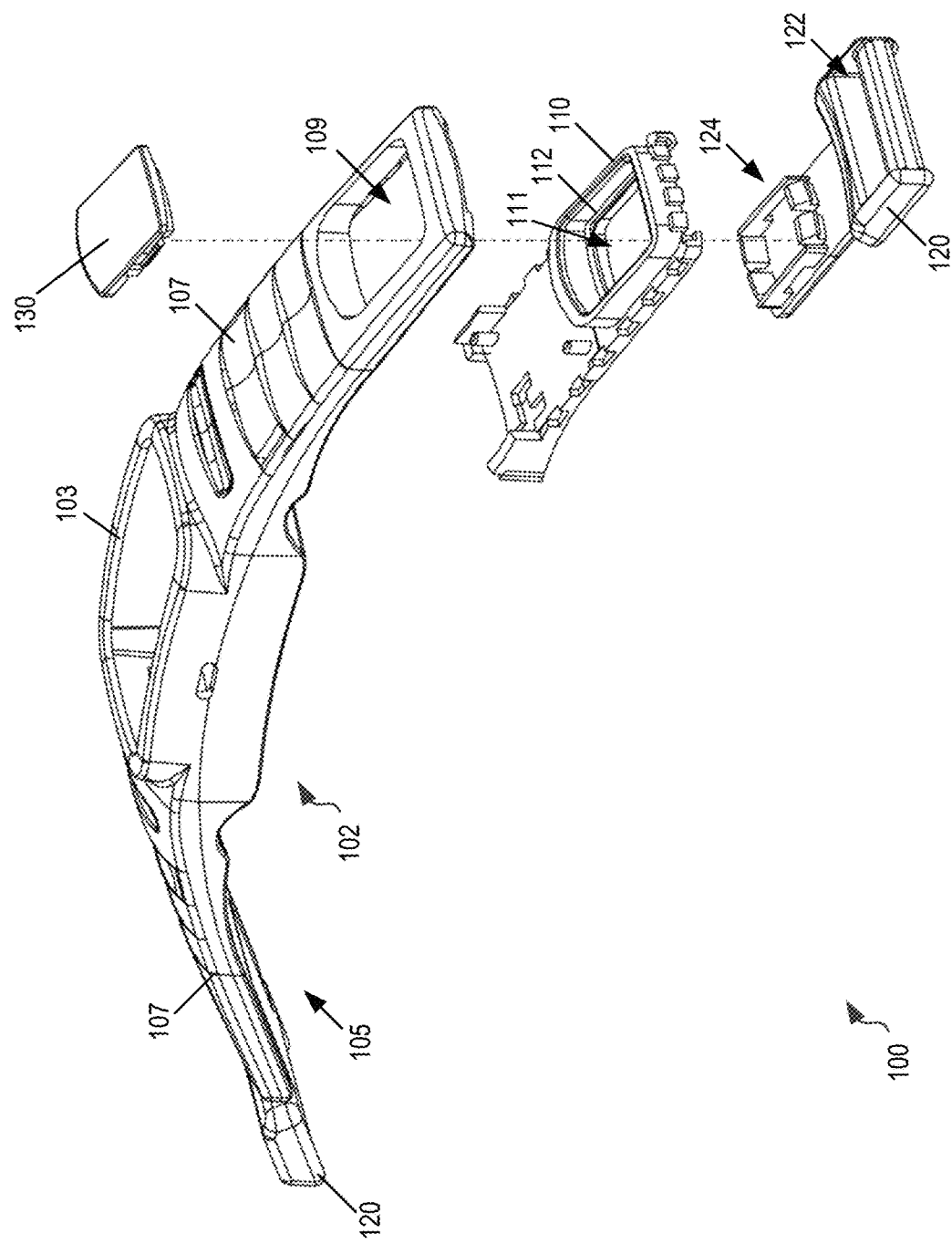
FIG. 4 is an exploded top perspective view of the portion of the animal collar shown in FIG. 1
Figure 5:
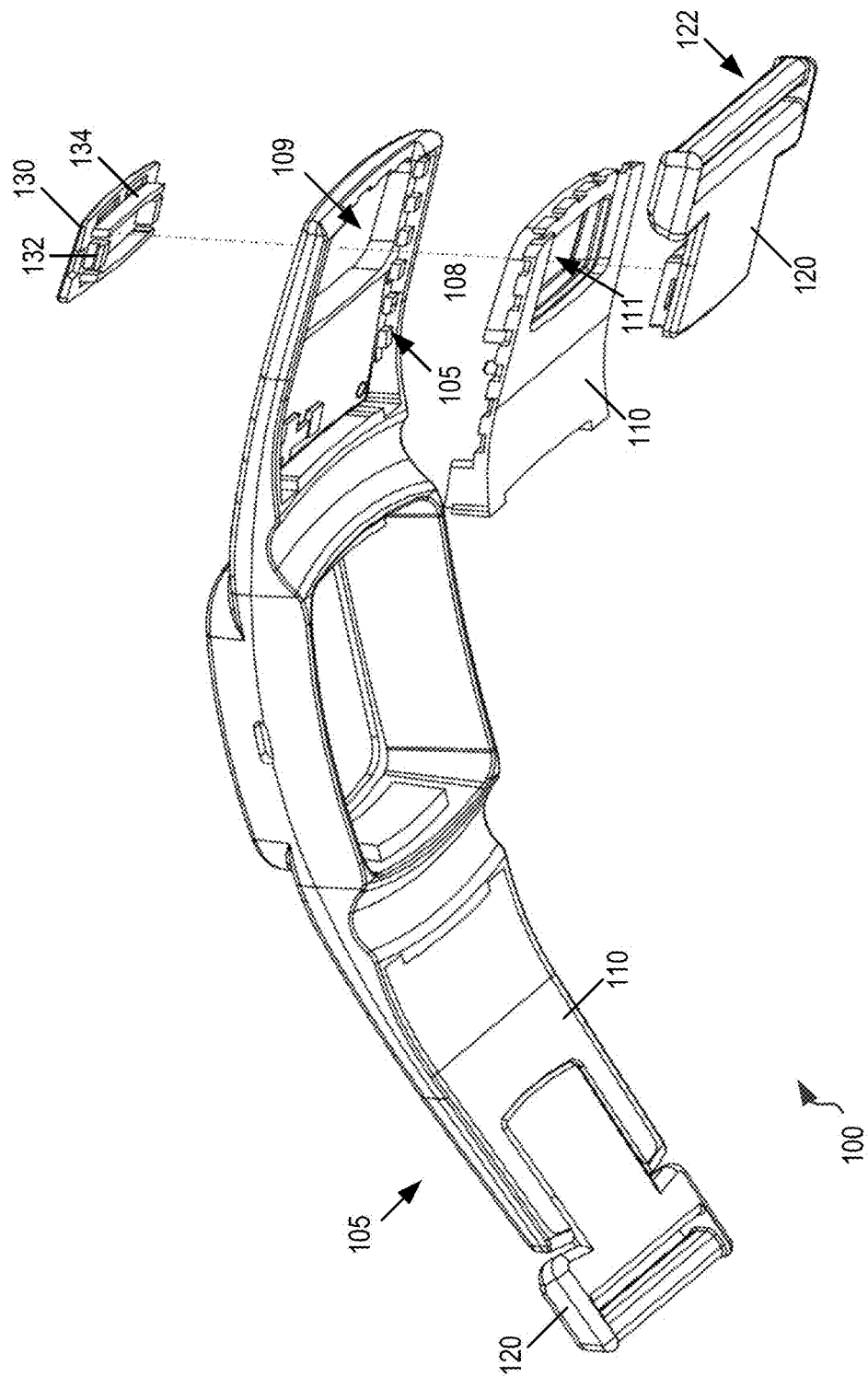
FIG. 5 is an exploded bottom perspective view of the portion of the animal collar shown in FIG. 1

As seen in FIGS. 2-3, the portion 100 of the animal collar 10 includes a housing portion 102, as well as extension portions 105. Generally speaking, the extension portions 105 include components that are resilient, but separable from the housing portion 102 to enable interchangeability of the flexible strap portion 12. The extension portions 105 may be constructed of a variety of lengths and/or widths, depending in part on the size of the animal intended as a wearer.

The housing portion 102 includes a central portion 103 that is generally constructed to be sized to receive an electrical stimulation system, including an electrical stimulation circuit in accordance with the present disclosure. Generally speaking, the housing portion 102, and central portion 103 in particular, maintains an interior cavity (not shown) within which circuit components may be housed. The housing portion 102 may take a variety of shapes or sizes, and is generally constructed to be of a size sufficient to house the circuitry described herein. In some examples, the housing portion 102 is constructed from plastic, rubber, or some combination thereof, and provides a barrier to protect circuit components from external environmental conditions (e.g., moisture, corrosion, and the like).

In the example shown, the extension portions 105 extend to either side of the central portion 103, and are constructed from a flexible or semi flexible material (e.g. rubber, plastic, and the like). The extension portions 105 each include a wing portion 107 extending from the central portion 103 of housing portion 102. The wing portions 107 each include an insert receiver location 108 (seen best in FIG. 5) including a molded section for receiving an insert 110. The wing portions 107 further include a strap receiver 120 and a retention cap 130. In examples, the wing portions 107 are formed in a manner integral with the central portion 103 of the housing portion 102, and receive the components that are selectably affixable to the housing portion, for example, the insert 110, strap receiver 120, and retention cap 130.

In the example shown, the insert 110 has a shape complementary to the insert receiver location 108, and includes a snap retention aperture 111. When the insert 110 is received at each receiver location 108, a portion of the insert 110 extends through an opening 109 through the wing portion 107 at each insert receiver location 108, such that the snap retention aperture 111 aligns with the opening 109. The snap retention aperture 111 includes an inner circumferential ridge 112. In some examples, the inner circumferential ridge 112 is continuous and extends along an entire inner circumference of the snap retention aperture 111; in other examples, the inner circumferential ridge 112 is positioned along less than the entire inner circumference of the snap retention aperture 111, and is instead positioned for engagement with a snap fitting of the strap receiver 120, described below.

In the example shown, the strap receiver 120 and the retention cap 130 are configured to cooperatively, releasably engage with the insert 110 at the snap retention aperture 111. The strap receiver 120 includes a strap insertion slot 122 and a snap fitting 124 constructed to be received at the snap retention aperture 111. In example embodiments, the snap fitting 124 includes a plurality of resilient snap engagement protrusions 126 that each engage with the interior circumferential ridge 112 of the retention aperture 111 The snap fitting 124 further includes a pair of side retention slots 128.

The retention cap 130 is received at the snap retention aperture 111, and forms a resilient snap fit to the strap receiver 120. Specifically, the retention cap 130 is received at the retention aperture 111 on an opposite side from the snap fitting 124 of the strap receiver 120. In the example shown, the snap fitting 124 is received from a rear side of the retention aperture, and the retention cap 130 is received from a front side of the retention aperture 111. The retention cap 130 includes cap retention extensions 132 positioned to be inserted into the side retention slots 128 when the retention cap 130 is inserted from the front side of the retention aperture 111. The retention cap 130 also includes support extensions 134 that insert into the retention aperture 111 when the retention cap 130 is inserted from the front side of the retention aperture, and are positioned proximate the snap engagement protrusions 126 when the retention cap 130 is inserted (best seen in the cross-sectional view provided in FIG. 8). In particular, the support extensions 134 are positioned on an opposite side of the snap engagement protrusions 126 as compared to the interior circumferential ridge 112, to provide additional support to resist deformation of the engagement protrusions 126 away from the interior circumferential ridge 112, thereby strengthening the engagement between the strap receiver 120 and the insert 110, while enabling interchangeability of the strap receiver 120 in the event of wear or damage.

Generally speaking, an exterior shape or appearance of the retention cap 130, the retention aperture 111, the insert 110, and the strap receiver 120 may vary widely. Positions of the snap fitting features, including the snap fitting 124, snap engagement protrusions 126, side retention slots 128, cap retention extensions 132, and support extensions 134 provide the mechanical engagement components that enable releasable, resilient retention of the strap.

Figure 6:
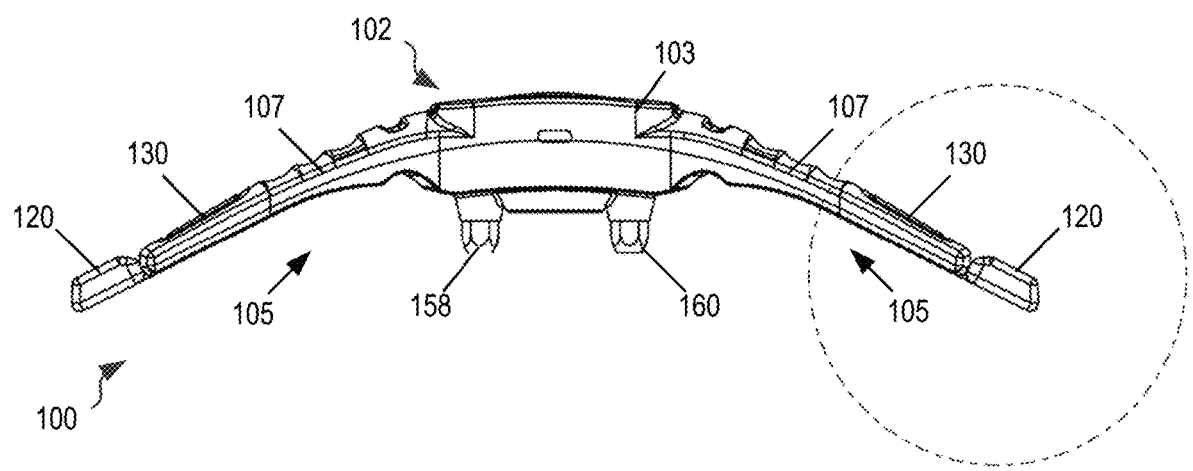
FIG. 6 is a side perspective view of the portion of the animal collar shown in FIG. 1.
Figure 7:
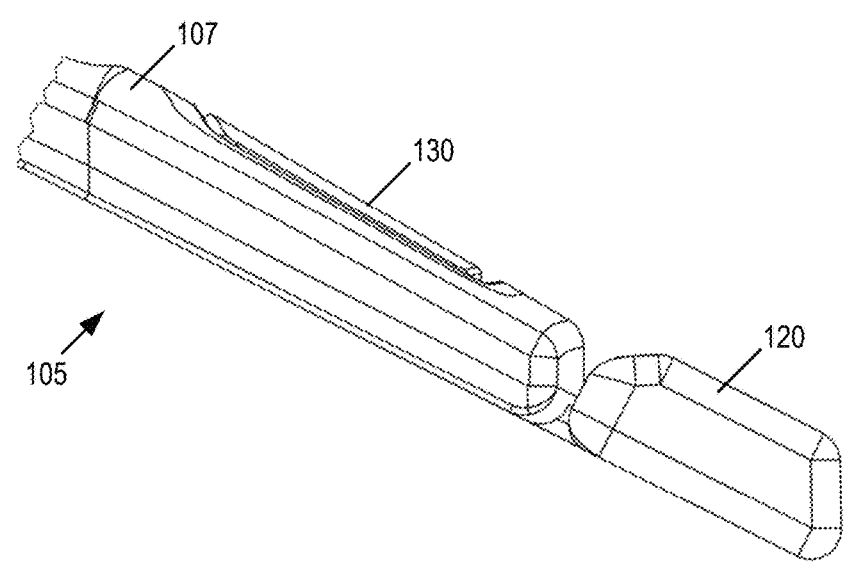
FIG. 7 is an isolated side plan view of an extension portion of the animal collar of FIG. 1.
Figure 8:
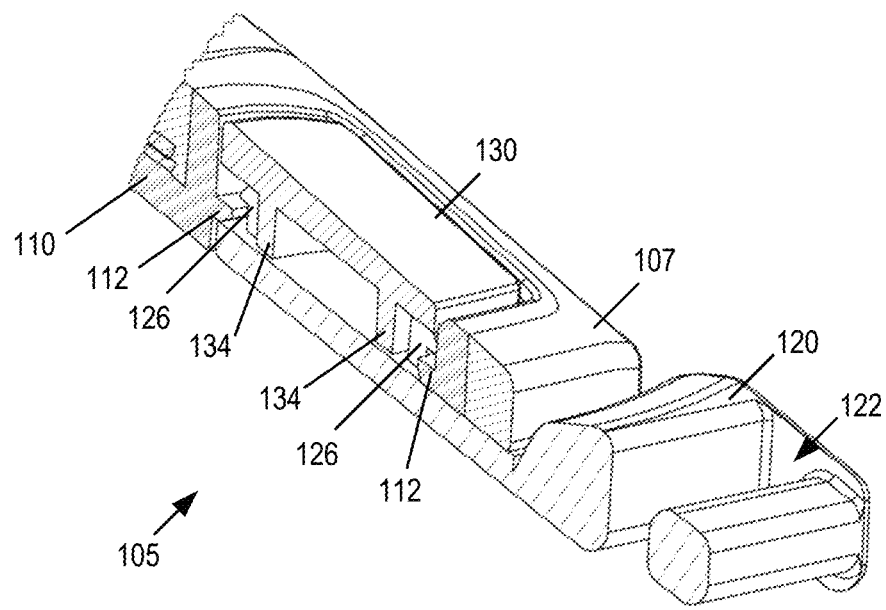
FIG. 8 is a cross-sectional view of the extension portion of the animal collar seen in FIG. 7.
Figure 9:
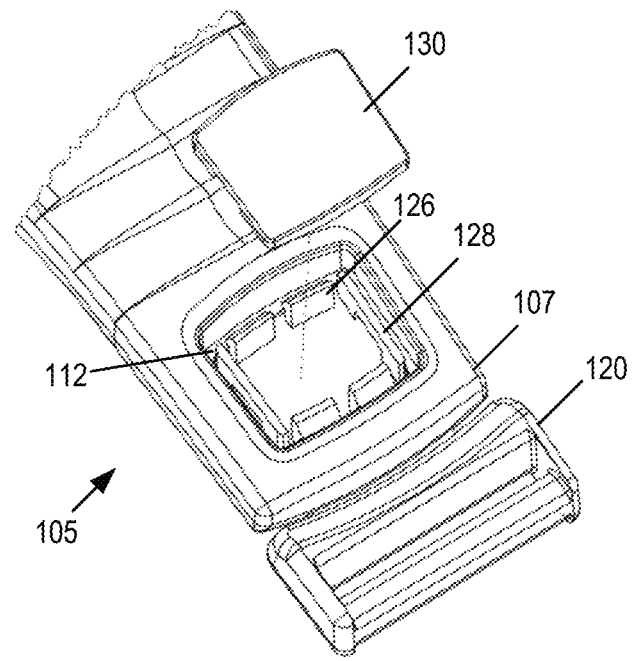
FIG. 9 is a partially-exploded perspective view of the extension portion of the animal collar of FIG. 7 with a retention cap removed.
Figure 10A:
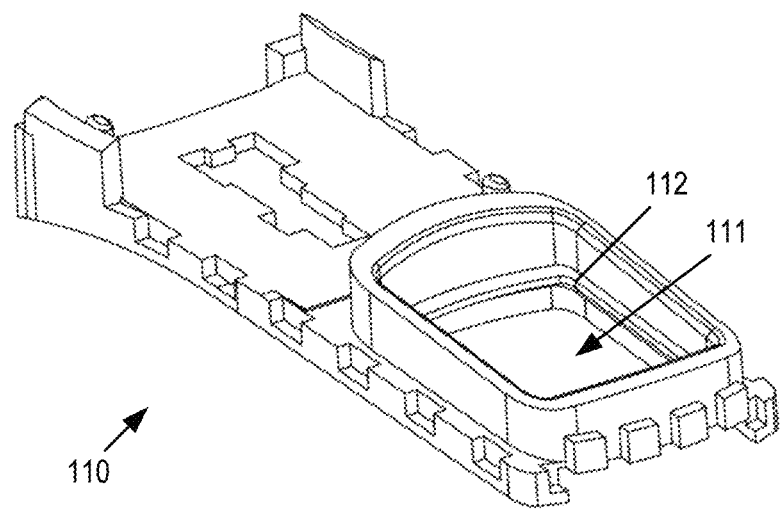
FIGS. 10A-10B are a top and bottom perspective views of an insert useable to implement aspects of the present disclosure.
Figure 10B:
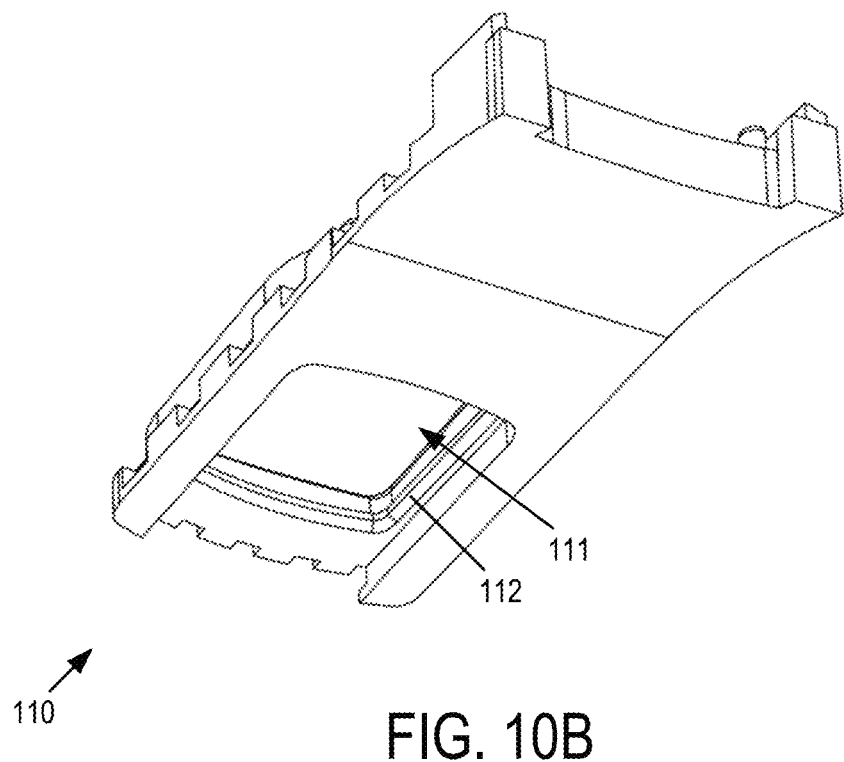
Figure 11A:
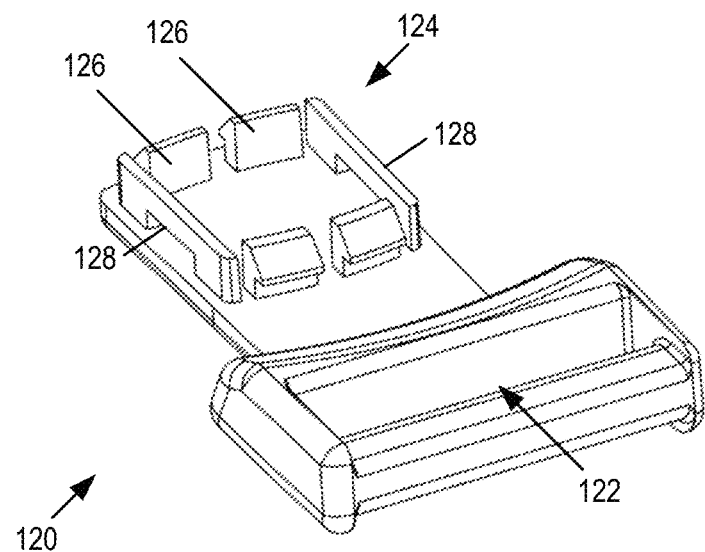
FIGS. 11A-11B are left and right top side perspective views of a strap receiver useable in the portion of the animal collar shown in FIG. 1.
Figure 11B:
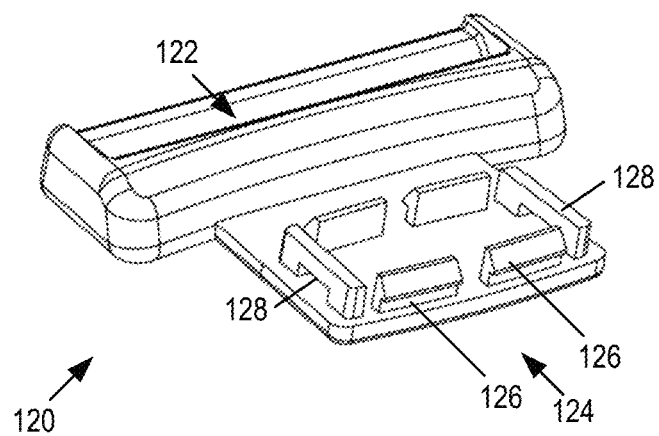
Figure 12A:
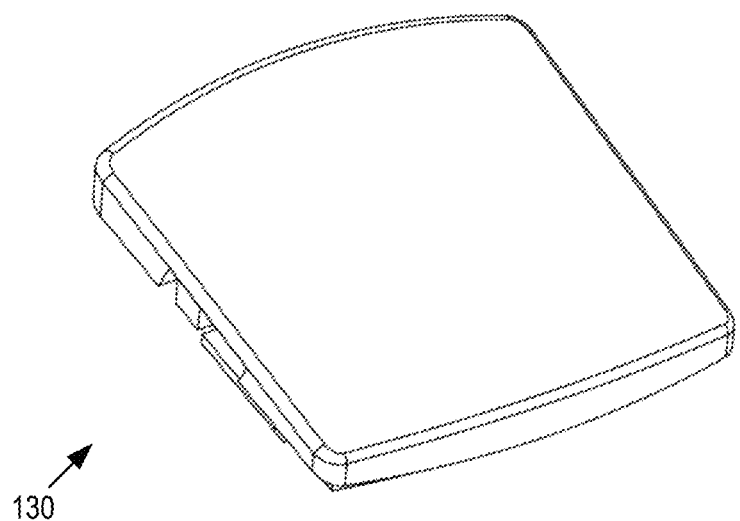
FIGS. 12A-12B are a top and bottom perspective view of a retention cap useable to implement aspects of the present disclosure.
Figure 12B:
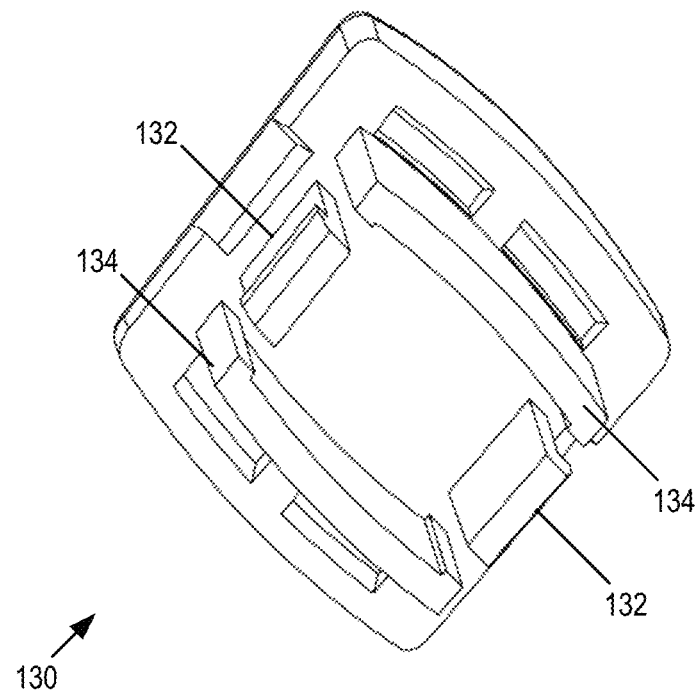

In particular, and as seen in FIGS. 3 and 6, a rear side of the central portion 103 of housing portion 102 includes a power button 154, data contacts 156, and a plurality of stimulus contacts, shown as a first stimulus contact 158 and a second stimulus contact 160. The power button 154 allows a user to activate or deactivate the electrical stimulation system contained within the housing portion 102. The data contacts 156 allow a user to charge a power source contained within the housing portion 102 (e.g., a rechargeable battery) and/or reprogram aspects of the electrical stimulation system (e.g., by providing a firmware update to adjust, e.g., the various stimulus modes or other operations of the electrical stimulation system). The data contacts 156 may also be referred to, in some instances, as charging contacts due to their use in recharging a battery internal to the housing portion 102. It is noted that, in some instances, the data contacts 156 may be used exclusively for charging, and not for data exchange.

The stimulus contacts 158, 160 extended from the rear side of the housing, and as such are positioned to contact an animal skin when the portion of the animal color 100 is positioned on an animal. The stimulus contacts 158, 160 are spaced apart from each other, and extend a distance away from the rear side of the housing portion 102 to ensure reliable contact. As further described below, the stimulus contacts 158, 160 receive stimulus signals from an electrical stimulation system maintained within the housing portion 102, and are positioned for delivery of electrical stimulus to a load connected across those contacts, e.g., at a skin contact of an animal.

Referring to FIGS. 1-12 generally, it is noted that the construction of an animal collar 10 as illustrated provides a number of advantages in terms of compactness, ruggedness, and replaceability of parts. For example, portions of a collar that typically receive significant wear, such as the strap receiver 120, may be replaceable alongside replacement of a strap, while preserving those components that are comparatively more expensive and/or which experience lower wear. Furthermore, because pressure on the strap components generally causes stretching of the collar components, cooperative and/or interlocking connection from both sides of an aperture improves the strength of connection of such replaceable components.

With respect to use in electrical stimulation, it is noted that the electrical stimulation system and electrical stimulation circuit may be embodied in a wide variety of types of devices. The animal collar 10 represents only one example implementation. Although typically worn on a collar around the neck of the animal, one skilled in the art will recognize that the animal collar 10 described above can be worn on a strap or harness around other portions of the animal. Furthermore, in alternative embodiments of the present disclosure, the electrical stimulation system may be implemented in a variety of other types of electronic animal training and containment systems, including bark control systems, remote training systems, and electronic containment fence systems. For example, a static mat may be used to impart electrical stimulus in accordance with the present disclosure, and may be located at a particular desired location in or around a residence. Such a mat could be powered via an external power source (e.g., via a home wall outlet connection) and may be placed at a location where electrical stimulus might be desired (e.g., at an entrance/exit to a house, in a particular room, or the like). An example of such a mat is described in U.S. Pat. No. 9,585,366, the disclosure of which is hereby incorporated by reference in its entirety. Other potential implementations of an electrical stimulation system are described, for example, in U.S. Pat. No. 8,011,327, the disclosure of which is hereby incorporated by reference in its entirety. In alternatives, a remotely-actuated training device may include an electrical stimulation system in accordance with the various embodiments described herein. In such an instance, a device worn by an animal may be communicatively connected (e.g., wired or wirelessly) to a user device, such as a mobile device or controller, which may be used by a trainer user to actuate the electrical stimulation system.

In such instances, the electrical stimulation circuitry and systems described below may be adapted for use in such devices. It is recognized that the advantages of the circuitry and signaling described herein (e.g., reduced power consumption, greater signal generation reliability, lower voltage signaling, and the like) may be applied across a variety of classes or types of devices in a manner consistent with the present disclosure.

II. Variable Stimulation Circuitry and Methods of Operation

Referring now to FIGS. 13-24, details regarding an electrical stimulation system and associated electrical stimulation circuit are provided. Such an electrical stimulation system and circuit may be useable within the context of the animal collar 10 described above, or any of the variety of other types of devices contemplated. As noted above, the circuitry and operational methods described herein may be implemented within a variety of types of stimulus devices including but not limited to an animal collar arrangement; as such, the above should be considered as an exemplary environment for such a stimulus device, rather than limiting on the below circuitry or operational methods.

Figure 13:
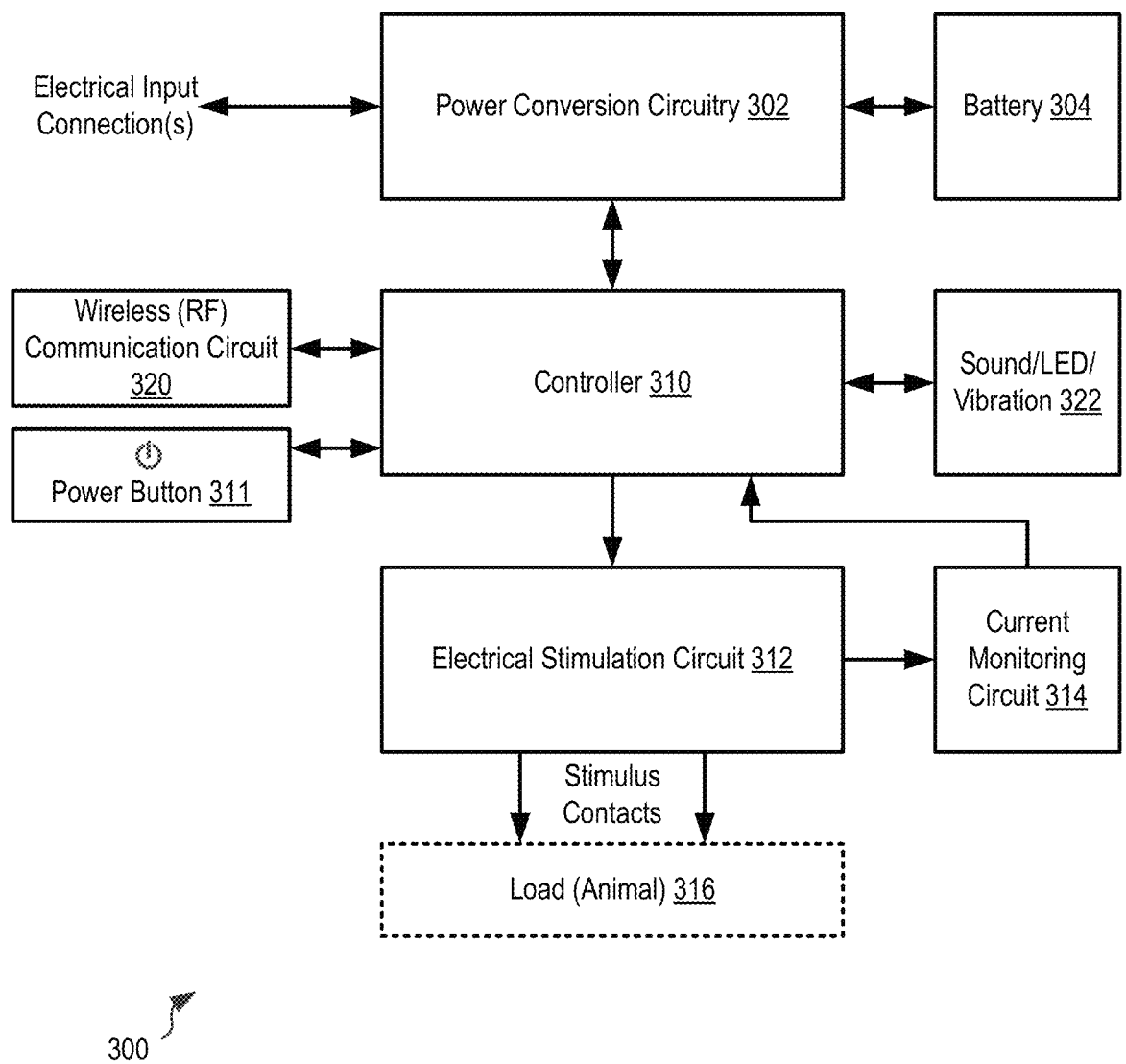
FIG. 13 is a schematic block diagram of an electrical stimulation system implemented within an animal collar, in accordance with example embodiments.

Referring to FIG. 13, a schematic block diagram of an electrical stimulation system 300 implemented within an animal collar such as that shown in FIGS. 1-12 is illustrated. The electrical stimulation system 300 generally includes power conversion circuitry 302 electrically connected to an energy source, such as a battery 304. The electrical stimulation system 300 further includes a controller 310 operatively connected to an electrical stimulation circuit 312.

In the example shown, the power conversion circuitry 302 manages power delivery from an energy source, such as battery 304, to various other components within the electrical stimulation system 300. In example implementations in which a battery is used as the energy source, the battery 304 is rechargeable, and may be implemented as a lithium ion battery or the like. As illustrated, the power conversion circuitry 302 may be electrically connected to one or more electrical input connections, such as the data contacts 156 seen in FIG. 3, which may be used for recharging the battery 304 in implementations where such a battery is used.

In implementations in which the electrical stimulation system 300 is implemented in a device that requires less portability, the energy source may be implemented using an electrical connection to an external energy source, such as an external alternating current (e.g., via A/C home electricity, for example from a wall outlet or power cable providing 120 VAC), or direct current (DC) external source, such as a DC power generator, solar panel or other environmental energy generation system, or the like. In further implementations, a combination of portable and non-portable power sources may be used.

In the example shown, the controller 310 is electrically connected to an electrical stimulation circuit 312, and provides a data signal usable to actuate the electrical stimulation circuit 312. The controller 310 may be any of a variety of general-purpose or application-specific integrated circuits configured to execute instructions to perform operations including, but not limited to: detecting events during which a stimulus should be applied; In example implementations, the controller 310 may be implemented using a microprocessor and a memory and may execute instructions to perform the processes described herein.

The controller 310 is operable to execute a plurality of software instructions (i.e., firmware) that, when executed, cause the system 300 to implement the methods and otherwise operate and have functionality as described herein. The controller 310 may comprise a device commonly referred to as a processor, e.g., a central processing unit (CPU), digital signal processor (DSP), or other similar device, and may be embodied as a standalone unit or as a device shared with components of the system 300, within a collar 100 as described herein. The controller 310 may include memory communicatively interfaced to the processor, for storing the software instructions. Alternatively, system 300 may further comprise a separate memory device for storing the software instructions that is electrically connected to the controller 310 for the bi-directional communication of the instructions, data, and signals therebetween.

As discussed in further detail below, the controller 310 may generate one or more packets of data signals, in the form of bursts of pulses, in accordance with a particular stimulus mode. In example embodiments, the controller 310 may be preprogrammed with a plurality of different stimulus modes. The stimulus modes may be selectable by a user, or may be selected automatically at the controller 310 in response to a particular condition and by the electrical stimulation system 300.

Each of the stimulus modes may be defined as including one or more packets of stimulus signals to be delivered from the controller 310 to the electrical stimulation circuit 312. Each packet of stimulation signals may include a burst of pulses, as well as an idle period. Each burst may include a plurality of pulses. The stimulus modes may vary, in some cases, based on the number of pulses within a burst, as well as the idle period between bursts. By adjusting these variables, different levels of stimulus may be generated and delivered by the electrical stimulation circuit 312. In further instances, different stimulus modes may also vary by amplitude of burst pulses. This may occur, for example, when burst pulses are generated from a flyback transformer operating within a linear operating voltage region, as discussed in further detail below.

In some instances, the controller 310 may also adjust a duration of each pulse (i.e., an amount of time the pulse is "on"). In example embodiments, the duration of the pulse is selected to ensure that the electrical stimulation circuit 312 is adequately energized for use in accordance with the selected stimulus mode. In alternative examples, the duration of the pulse is held constant, and stimulus modes are controlled based on the number of pulses within a burst, a timing between bursts, and a number of bursts within a packet. Additional details regarding this timing are provided below in conjunction with FIG. 18.

In the example shown, the controller 310 is communicatively connected to a wireless communication circuit 320, as well as output devices 322. The controller 310 may also be electrically connected to a power button 311, which initializes operation of the electrical stimulation system 300 overall. The wireless communication circuit 320 may be configured as a radio frequency (RF) transmitter and/or receiver, and may be used to determine a relative location of the electrical stimulation system 300 relative to one or more external RF transmitters or receivers. For example, the wireless communication circuit 320 may receive an indication that the electrical stimulation system 300 is located at a particular position relative to one or more other transceivers, thereby causing the controller 310 to initiate an electrical stimulus via the electrical stimulation circuit 312. In example embodiments, based on a determined location of the electrical stimulation system 300 relative to one or more other transceivers, a particular stimulus mode may be either communicated to the system 300 or determined to be applied at the system itself. For example, based on a collar 10 including a system 300 being far from a particular transceiver, a stimulus mode may be selected from among a plurality of different stimulus levels. In some examples, a low, medium, or high stimulus level may be selected, with each stimulus level representative of a different number of pulses per burst or packet. Details regarding example stimulus modes are described in further detail below in conjunction with FIG. 18.

In alternative embodiments, one or more other sensors may be included in the system 300, and communicatively connected to the controller 310. For example, a sound or vibration sensor may be used in a collar used for purposes of controlling animal auditory sounds (e.g., a "bark control" collar), and the controller 310 may initiate an electrical stimulus in response thereto. In further examples, a combination of sensors and different electrical stimuli could be incorporated within the same device.

Furthermore, although specific wireless communication and/or output devices are described herein as being supported by the wireless communication chip 320, it is noted that the electrical stimulation system 300 may include one or more other types of devices. For example, global positioning system (GPS), temperature and/or motion sensor devices may be incorporated into such a system as well, and may be used to determine whether a stimulus event should occur, and if so, the selected stimulus mode that would be appropriate given the circumstance.

In the example shown, the output devices 322 may include one or more sound, light, and/or vibration devices. Such devices may be configured to be actuated by the controller 310 in response to particular conditions, for example to indicate a location of the electrical stimulation system 300, to indicate a low battery status, or other types of conditions.

The electrical stimulation circuit 312 receives a data input from the controller 310, and generates an electrical stimulus at stimulus contacts (e.g., stimulus contacts 158, 160 of FIG. 3) which may be applied to a load 316. The load 316 may correspond, for example, to an animal to which the electrical stimulus is to be applied. As discussed further below, the electrical stimulation circuit 312 is generally constructed using a flyback transformer which is selectively energized from the battery 304 in response to the data input signals, in the form of data packets (including bursts of pulses). The flyback transformer may then deliver higher energy, pulse signals from the stimulus contacts in accordance with a stimulus mode to encourage or correct animal behavior.

In example implementations, a current monitoring circuit 314 may also be incorporated within the electrical stimulation system 300. The current monitoring circuitry 314 may monitor a current used to energize the flyback transformer included within the electrical stimulation circuit 312, for example to determine whether the transformer is adequately energized, and to determine when the transformer is operating in a linear mode or in a saturation mode. The current monitoring circuit may also be used to monitor a reflected flyback voltage, for example to monitor the effectiveness of coupling an output to the load. In example implementations, the current monitoring circuit may be used to provide feedback to the controller 310, which may in turn adjust a supply voltage to the electrical stimulation circuit, or adjust a pulse duration of pulses included in the data input to the electrical stimulation circuit 312.

Although illustrated as connected to the controller 310, it is noted that the power conversion circuitry 302 may generate a variety of other power signals accessible to other components within the electrical stimulation system 300. For example, voltage supply may be provided by the power conversion circuitry 302 to components including the wireless communication chip 320, the electrical stimulation circuit 312, the current monitoring circuit 314, and the various output devices 322. The connection to controller 310 is intended as exemplary, rather than limiting. Additionally, the power conversion circuitry 302 may discriminate among power and data signals, providing power to the controller 310 and/or battery 304, and routing data signals received via electrical input connections to the controller 310 as well (e.g., for reprogramming, data log capture, and the like).

Figure 14:
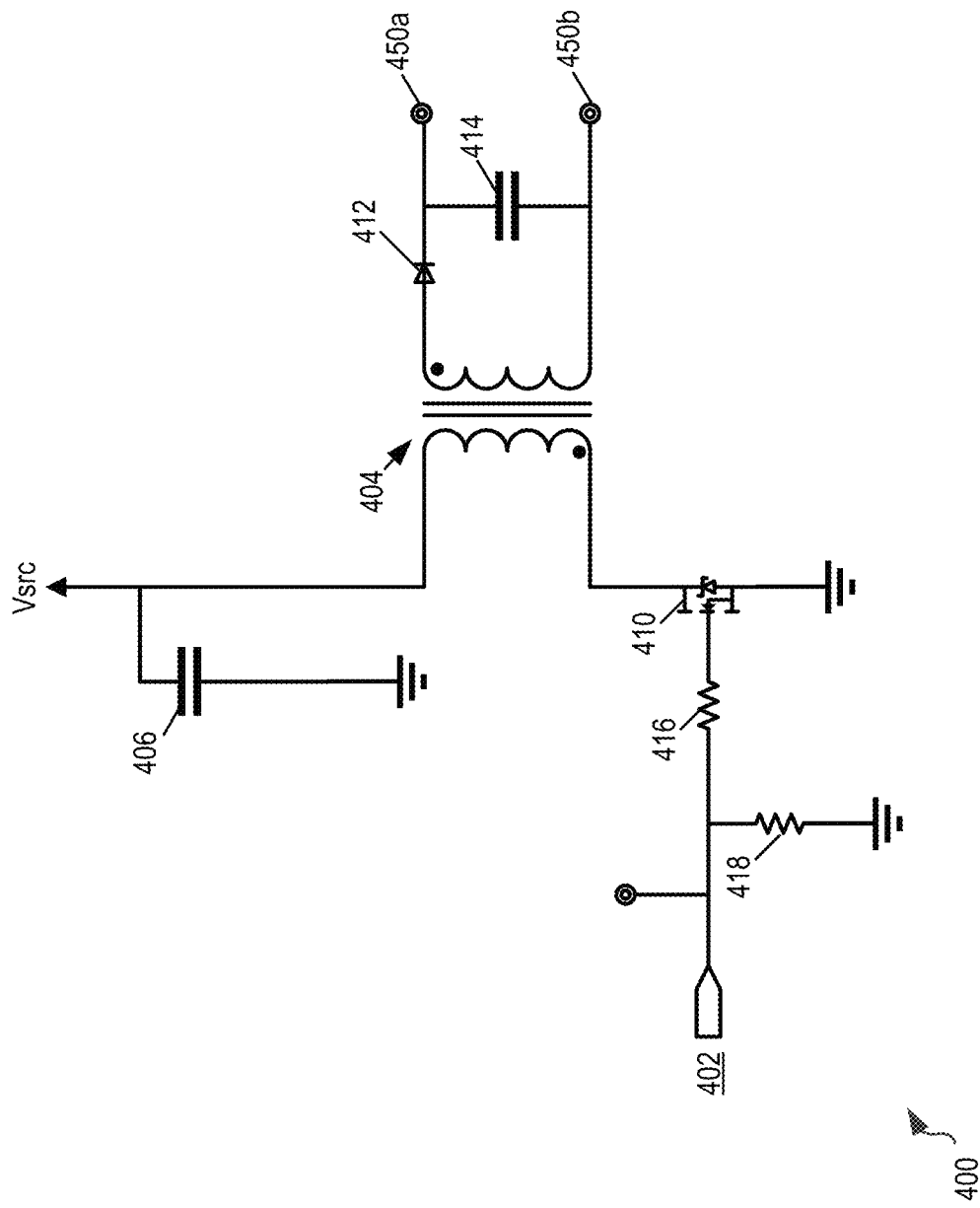
FIG. 14 is an example circuit schematic of an electrical stimulation circuit useable within the system of FIG. 13.
Figure 15:
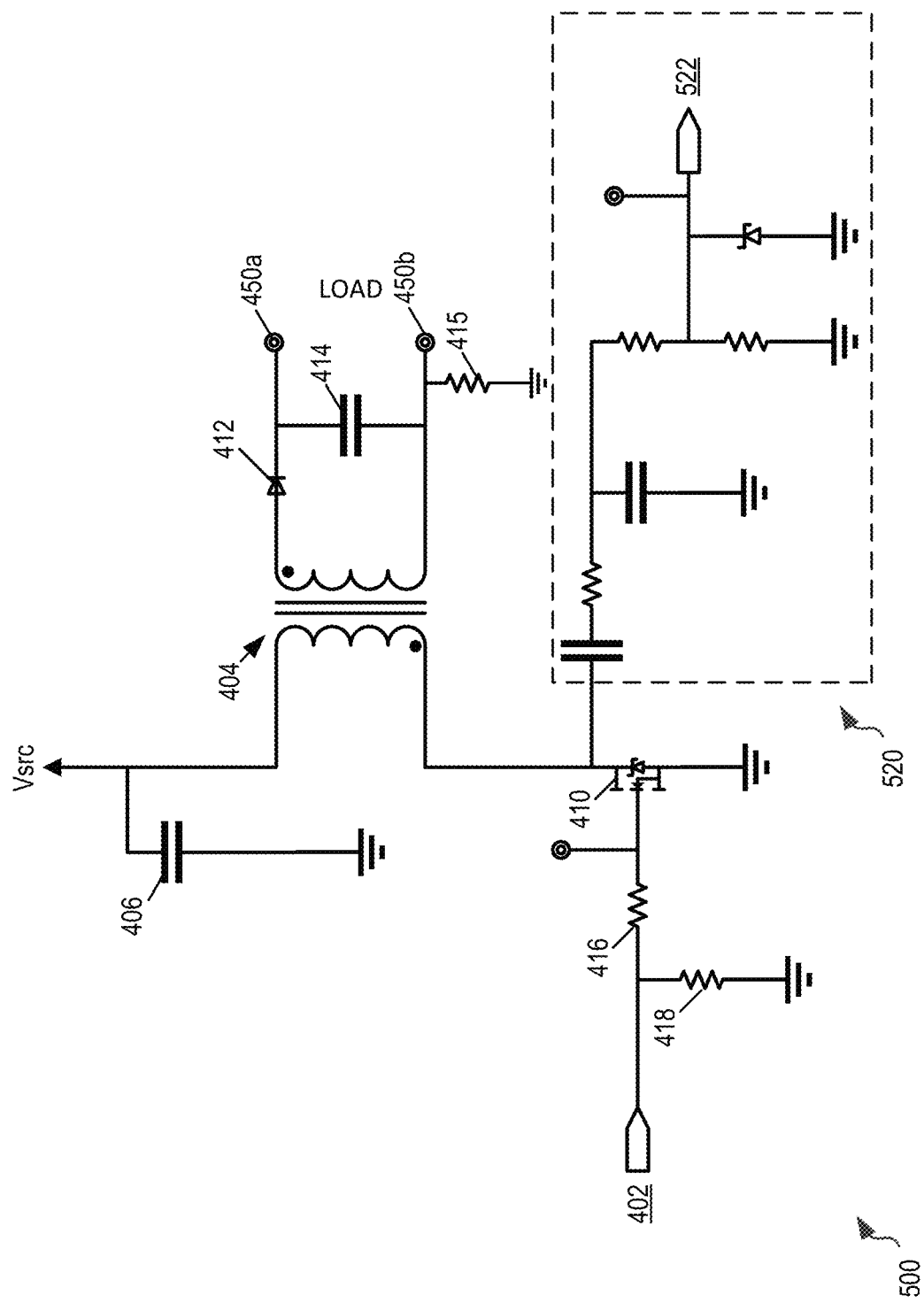
FIG. 15 is an example circuit schematic of an electrical stimulation circuit and associated current sensing circuit, in accordance with an alternative embodiment.

Referring now to FIGS. 14-15, example electrical stimulation circuits are illustrated that are useable within the electrical stimulation system 300 of FIG. 13, and useable within the collar 100 described above in conjunction with FIGS. 1-12. In FIG. 14, an electrical stimulation circuit 400 has a data input signal line 402 usable to selectively energize a flyback transformer 404 via an electrically-operable switch 410. In particular, a flyback transformer 404 may have a primary side that is electrically connected between a voltage source (Vsrc) and a ground. The electrically-operable switch 410 may be connected between the flyback transformer 404 and ground, and may be implemented as a MOSFET-type transistor or other electrically-operable switch. The electrically-operable switch 410 is selectively actuatable by the data input signal line 402 between an open position in which the primary side of the flyback transformer 404 is disconnected from ground, and a closed position in which the primary side of the flyback transformer 404 is connected to ground. In alternative or additional example embodiments, current flow to the flyback transformer 404 may be controlled via the data input signal line 402 by using a linear region of the electrically-operable switch 410. Additionally, in some instances, two or more switches may be used in a switching network to achieve a desired current flow at the flyback transformer 404. A resistor network, formed from resistors 416, 418, is positioned between the data input signal line 402 and a gate of the electrically-operable switch 410.

In the embodiment shown, when the electrically-operable switch 410 is in a closed position (e.g. based on a high voltage received at a gate of a MOSFET device), a current will flow through the primary side winding of the flyback transformer 404, thereby energizing the flyback transformer. In some implementations, a capacitor 406 electrically connected between the voltage source and ground on the high-voltage side of the primary winding of the flyback transformer 404 may be used to assist in delivering a constant voltage at the primary side of the flyback transformer, and provide adequate charge to allow for quick energizing of the flyback transformer. In other implementations, the capacitor 406 may be excluded entirely from the circuit (e.g., where such additional charge or energization is not required beyond that provided by a power source).

In some additional implementations, current flowing through the primary side of the flyback transformer 404 may also be adjusted by incorporation of circuit elements, such as additional resistive elements and/or gate drive circuits at the primary side. For example, a resistive element may be positioned between the voltage source and the flyback transformer, or between the flyback transformer and the electrically-operable switch 410. Alternatively or additionally, switching elements and/or variable resistance elements may be included within the circuit at the primary side of the flyback transformer 404, for example to vary voltage and/or current levels, or timing to reach saturation of that transformer.

In some examples, a series of switches, connected in parallel with each other, may be used to selectively introduce various resistive elements at the primary side of the flyback transformer 404. In such cases, an output from a controller may include a plurality of signal values, to actuate selective gates in various sequences (e.g., either concurrently, or separately, and within the same burst or in different bursts) to cause different current levels at the flyback transformer and different output signal amplitudes at the secondary side of the flyback transformer.

In the example shown, the secondary side of the flyback transformer 404 is electrically connected to stimulus contacts 450a-b. The stimulus contacts 450a-b may be electrically connected to, or correspond to, stimulus contacts 158, 160 of FIG. 3, and may electrically connect across a load 316 as seen in FIG. 13, above. In the example shown, a diode 412 is connected at a first side of the secondary winding of the flyback transformer, e.g., between the flyback transformer and a stimulus contact 450a. Additionally, a capacitor 414 is electrically connected across the secondary side of the flyback transformer, in parallel with a load connected across the stimulus contacts 450a-b. Generally speaking, the diode 412 is oriented in a forward orientation toward stimulus contact 450a, and therefore blocks reverse voltage during a flyback event. This will prevent forward voltage conduction through the output. The capacitor 414 is used to ensure that open circuit events do not cause damage to the transformer, and also acts to supplement energy output by the secondary side of the flyback transformer 404 during individual flyback events. That is, any charge aggregated on the capacitor 414 during normal operation aids in a breakdown voltage at the load (e.g. at an animal skin) on the stimulus contacts 450a-b. In that way, if energy is not fully conducted into the load, the capacitor will retain any remaining energy to supplement subsequent pulses.

In operation, each pulse received at the data input signal line 402 will result in the electrically-operable switch 410 closing for the duration of the pulse, causing the flyback transformer 404 to be energized from the voltage source and capacitor 406. Once the pulse ends and the electrically-operable switch 410 opens, a flyback event occurs, in which the flyback transformer 404 discharges on the secondary side, causing a current to be discharged across a load connected at the stimulus contacts 450a-b. The direction of current will be enforced by the diode 412, and the extent of the charge to be discharged at the load is supplemented by charge on the capacitor 414. If no load is connected at the stimulus contacts 450a-b, the flyback event will simply charge the capacitor 414 until a load is connected across the contacts 450a-b. In this way, each pulse can represent a flyback event, and the flyback events in quick succession (e.g., in a burst) can aggregate output charge at the capacitor 414 and at a load, thereby generating an output signal that would otherwise have a stimulus effect that is achievable typically with only a far larger flyback transformer.

In examples, the circuit components selected for use within the electrical stimulation circuit 400 allow an output voltage in a range of 100-6000V, and in some instances 500-2000V. The circuit components may be selected to deliver up to 100 or more pulses in a given stimulus signal packet. Other voltages and/or pulse counts within a burst may be used as well. In a particular example, a voltage in the range of 500-800 volts for repeated, burst pulses from a flyback transformer may be used with a variable pulse generation arrangement, as compared to a single pulse in a range of 2000-6000 volts in a traditional construction. In this context, a perception of a signal remains effective for training and/or behavior correction, due to the increased number of pulse events that occur. Generally speaking, signal outputs are compliant with existing technical requirements and standards, such as the 490-5904 ECMA Standard, "Technical Requirements for Electronic Pet Training and Containment Collars", and/or any standards or codes of practice issued by the Partnership for Electronic Training Technology ("PETE").

Referring now to FIG. 15 a further example circuit schematic of an electrical stimulation circuit 500 is shown. In the example shown, the electrical stimulation circuit 500 is generally similar to the circuit 400 described previously. In this example, a resistor 415 is connected to the secondary side of the flyback transformer 404 at stimulus contact 450b (i.e., an opposite side of the load compared to diode 412). The resistor 415 may discharge lingering floating voltage (e.g., static voltage) on the stimulus contact 450b when not connected to a load.

Additionally, in this example circuit 500, a current sensing circuit 520 may be used, for example, as an example of the current monitoring circuit 314 of FIG. 13. The current sensing circuit 520 may generate a current sensing output 522, which may be provided to a controller (e.g., controller 310 of FIG. 13) to determine current passing through the primary side of the flyback transformer 404 when it is in the process of being energized. In the example shown, a charge capture circuit including a resistor-capacitor network may be used to capture a peak current, which may in turn be accessed and measured at the current sensing output 522. In other examples, the current sensing circuit 520 may be excluded entirely. Nevertheless, to the extent the current sensing circuit 520 is used, the current sensing output 522 may be used by the controller to adjust a pulse width of subsequent pulses initiated by the controller and output by the flyback transformer.

Figure 16:
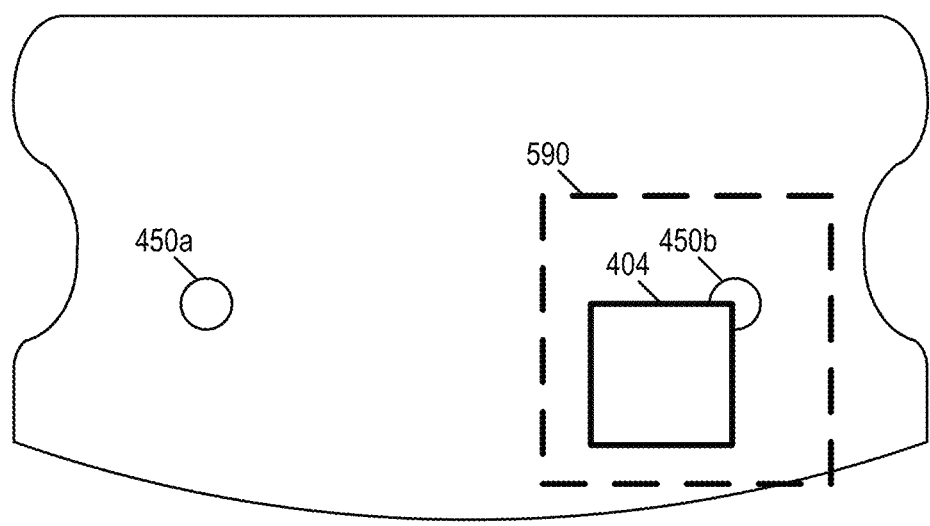
FIG. 16 is a schematic outline of a circuit board useable in an animal collar as described herein, illustrating comparative sizing of a transformer usable in the electrical stimulation circuit of FIGS. 13-15.

Referring to FIG. 16, an example schematic depiction of a circuit board 550 on which an electrical stimulation circuit 312 may be implemented. For simplicity, the circuit board 550 may be sized and/or shaped to be included in an animal collar, such as the animal collar 10 described above. In this example, the circuit board 550 is electrically connected to a pair of electrical contacts 450a-b that are spaced apart from each other and mounted to the circuit board. The circuit board 550, as illustrated, is shown without most circuit components or circuit routing positioned thereon; however, it is depicted to show relative sizing of the flyback transformer 404 of the present disclosure as compared to a typical, previously utilized transformer 590. As illustrated, the flyback transformer 404 of the present application takes up significantly less circuit board surface area and significantly less volume within a housing that retains the circuit board 550. In example implementations flyback transformer 404 may have a total volume of less than 1000 cubic millimeters, and in some instances, may be approximately 675 cubic millimeters. By contrast, an existing transformer used in such a circuit, such as transformer 590 may have a volume of greater than 3000 cubic millimeters, e.g., approximately 3100 cubic millimeters. While being significantly smaller (nearly 5× smaller on a volumetric basis), a stimulus signaling may be generated that remains effective at encouraging animal behavior by using such a transformer, in some instances, in a saturation mode, and adjusting signaling/actuation of that transformer to generate different types of flyback events output from the transformer to achieve improved stimulus signaling effects.

Figure 17:
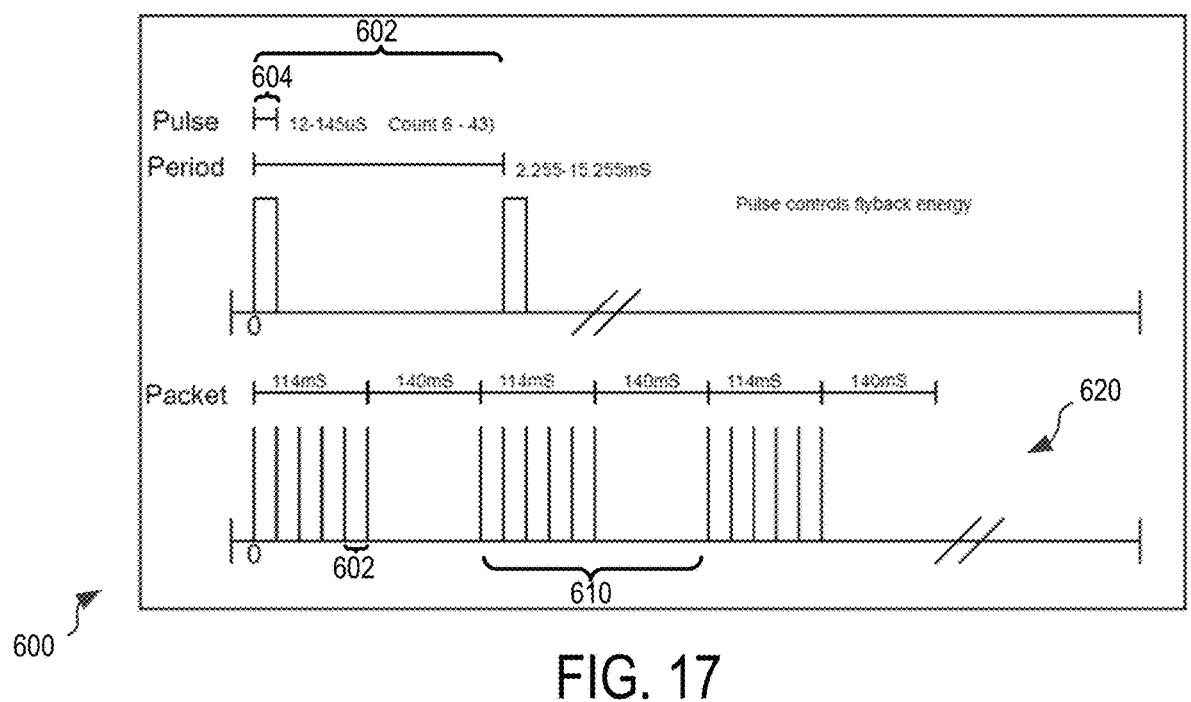
FIG. 17 is a timing diagram of a pulse-based stimulation signal generated in accordance with traditional methods.
Figure 18:
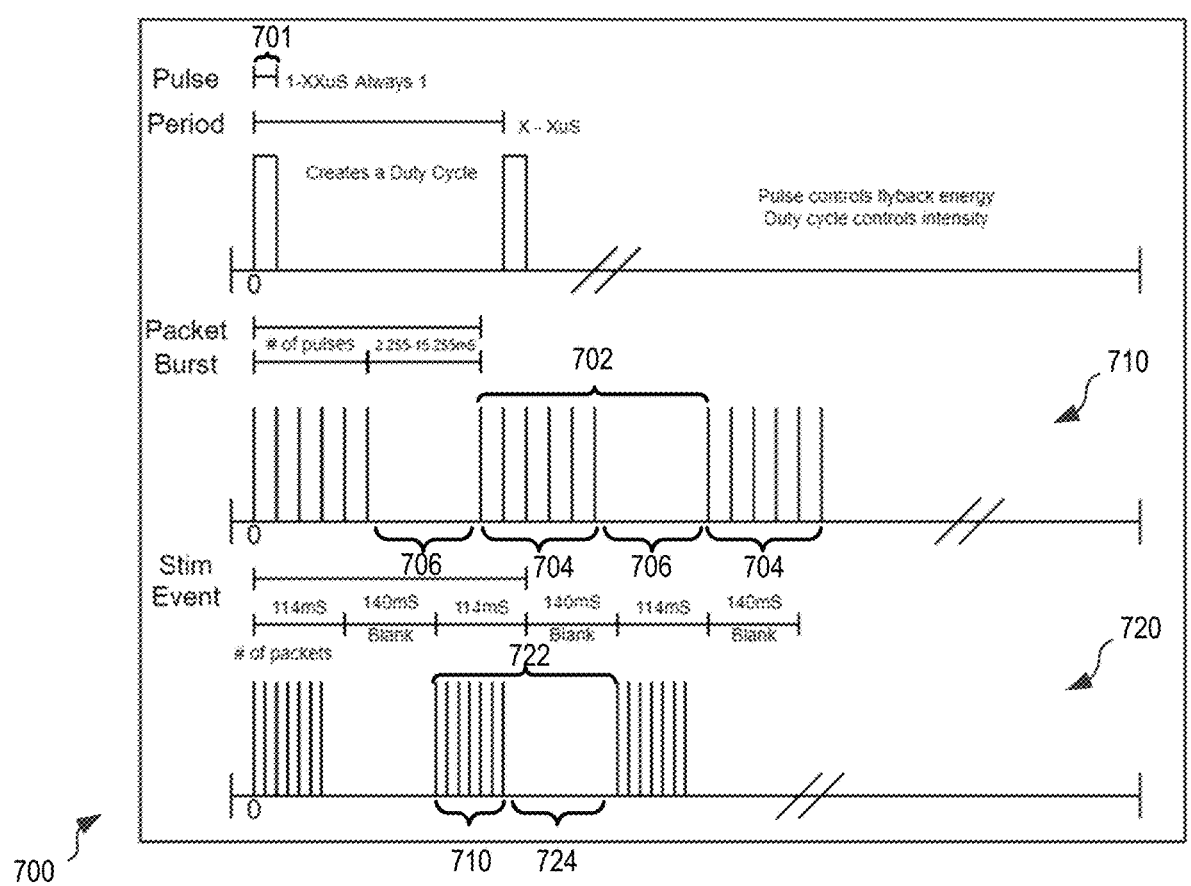
FIG. 18 is a timing diagram of a variable-pulse stimulation signal useable to actuate an electrical stimulation circuit as described herein.

Referring now to FIGS. 17-18, a specific comparison between pulse-based stimulation signal and a variable pulse stimulation signal is provided. FIG. 17 illustrates a timing diagram 600 of a pulse-based stimulation signal in accordance with traditional methods, Such a signal includes an individual period 602 of 2.255 to 15.255 milliseconds, within which a pulse 604 of variable duration may be applied. The pulse 604 may be of a duration of 12-145 microseconds. Accordingly, a series of pulses 604 may be delivered in a given period 602, with the pulse duration being varied to adjust to different stimulus levels desired (i.e., different levels of energization of a flyback transformer). A packet 620 of stimulus signals can include a series of pulse periods 602 followed by an inactivity period to result in an overall stimulation period 610. Such a stimulation period may have a pulse period of 114 milliseconds and an inactivity period of 140 milliseconds in the example shown leading to an overall signaling period that may approach or exceed 300 milliseconds.

By contrast, FIG. 18 is a timing diagram 700 of a variable-pulse stimulation signal useable to actuate an electrical stimulation circuit as described herein. In the example timing diagram shown, a pulse 701 is delivered individually, and has a predetermined, constant duration. In this example, a packet burst 710 may be defined as a series of pulse periods 702, constructed from an active pulsing period 704 and an inactivity period 706. Each active pulse period 702 can last from, e.g., 2.255 to 15.255 milliseconds. A stimulus packet forming a stimulus event signal 720 may be constructed using a series of packet bursts in a packet burst period 710 followed by an inactivity period 724, forming an overall signaling period 722 that may be repeated within a given stimulus signal packet 720. As such, each of the pulse spikes seen in the stimulus event signal 720 can represent a separate packet burst including a configurable series of pulses, whereas the pulses in the packet 620 represent individual pulses. By varying the number of pulses within a burst, a similar stimulus effect is obtained without need to vary the pulse duration of a given pulse, instead varying a number of pulses and associated flyback events that are generated.

In accordance with the variable-pulse stimulation signal construct shown in FIG. 18, it is noted that a variety of stimulus modes may be defined and implemented using a controller, and stimulus signals in accordance with a selected delivery mode may be generated based on communicated and/or sensed condition/location of a collar 100 via the electrical stimulation system 300 described above. For example, a set of intensity levels may be selected, in a range of 1-10, and for each intensity level, a command severity level of low/medium/high may be defined (for a total of up to or exceeding 30 separate stimulus modes). Each stimulus mode may be defined including a number of pulses per burst period, duty cycle of burst pulses, burst period, a length of an inactivity period between burst periods, and an overall packet length (period). In examples, a stimulation voltage of up to about 800 volts may be used, with a sequence of individual stimulation pulses of about eight microseconds of active time (rather than up to or exceeding 2000 volts in a single pulse for a total period of up to or exceeding 300 microseconds). A specific example set of stimulus pulses for a particular level (from levels 1-10) and mode (low/medium/high) may be preset in a controller in accordance with the burst sequence definitions in Tables 1-6, below. Tables 1-3 illustrate example signaling for low, medium, and high modes across 10 different preset correction levels and using a constant period of 16 microseconds, while Tables 4-6 illustrate use of a constant pulse duration and change the number of pulses per burst across correction levels, using a constant duty cycle and period for each mode, but varying across low/medium/high modes. Other stimulation sequences and schemes may be used as well in accordance with such a variable pulse system; the below tables are intended as exemplary rather than limiting.

TABLE 1

Variable Pulse Burst Sequences - Low Mode, 16 us Period

| Level | Mode | # of Bursts | Burst Period (us) | # of Pulses | Period (uS) | Duty Cycle | Pulse (uS) |
|---|---|---|---|---|---|---|---|
| 1 | Low | 3 | 30000 | 1 | 16 | 15% | 2.4 |
| 2 | Low | 3 | 30000 | 2 | 16 | 10% | 1.6 |
| 3 | Low | 3 | 30000 | 1 | 16 | 20% | 3.2 |
| 4 | Low | 3 | 30000 | 2 | 16 | 10% | 1.6 |
| 5 | Low | 3 | 30000 | 2 | 16 | 15% | 2.4 |
| 6 | Low | 3 | 30000 | 3 | 16 | 10% | 1.6 |
| 7 | Low | 3 | 30000 | 2 | 16 | 20% | 3.2 |
| 8 | Low | 3 | 30000 | 5 | 16 | 15% | 2.4 |
| 9 | Low | 3 | 30000 | 8 | 16 | 20% | 3.2 |
| 10 | Low | 3 | 30000 | 10 | 16 | 20% | 3.2 |

TABLE 2

Variable Pulse Burst Sequences - Medium Mode, 16 uS period

| Level | Mode | # of Bursts | Burst Period (us) | # of Pulses | Period (uS) | Duty Cycle | Pulse (uS) |
|---|---|---|---|---|---|---|---|
| 1 | Medium | 20 | 4500 | 2 | 16 | 15% | 2.4 |
| 2 | Medium | 20 | 4500 | 2 | 16 | 20% | 3.2 |
| 3 | Medium | 20 | 4500 | 3 | 16 | 15% | 2.4 |
| 4 | Medium | 20 | 4500 | 3 | 16 | 20% | 3.2 |
| 5 | Medium | 20 | 4500 | 3 | 16 | 25% | 4.0 |
| 6 | Medium | 20 | 4500 | 4 | 16 | 25% | 4.0 |
| 7 | Medium | 20 | 4500 | 6 | 16 | 30% | 4.8 |
| 8 | Medium | 20 | 4500 | 8 | 16 | 30% | 4.8 |
| 9 | Medium | 20 | 4500 | 10 | 16 | 35% | 5.6 |
| 10 | Medium | 20 | 4500 | 20 | 16 | 35% | 5.6 |

TABLE 3

Variable Pulse Burst Sequences - High Mode, 16 uS period

| Level | Mode | # of Bursts | Burst Period (us) | # of Pulses | Period (uS) | Duty Cycle | Pulse (uS) |
|---|---|---|---|---|---|---|---|
| 1 | High | 43 | 2250 | 2 | 16 | 20% | 3.2 |
| 2 | High | 43 | 2250 | 6 | 16 | 20% | 3.2 |
| 3 | High | 43 | 2250 | 8 | 16 | 20% | 3.2 |
| 4 | High | 43 | 2250 | 11 | 16 | 30% | 4.8 |
| 5 | High | 43 | 2250 | 14 | 16 | 30% | 4.8 |
| 6 | High | 43 | 2250 | 15 | 16 | 30% | 4.8 |
| 7 | High | 43 | 2250 | 23 | 16 | 40% | 6.4 |
| 8 | High | 43 | 2250 | 30 | 16 | 40% | 6.4 |
| 9 | High | 43 | 2250 | 40 | 16 | 50% | 8.0 |
| 10 | High | 43 | 2250 | 55 | 16 | 50% | 8.0 |

TABLE 4

Variable Pulse Burst Sequences - Low Mode, 10 uS period

| Level | Mode | # of Pulses | Period (uS) | Duty Cycle | Pulse (uS) |
|---|---|---|---|---|---|
| 1 | Low | 2 | 10 | 32% | 3.2 |
| 2 | Low | 3 | 10 | 32% | 3.2 |
| 3 | Low | 4 | 10 | 32% | 3.2 |
| 4 | Low | 5 | 10 | 32% | 3.2 |
| 5 | Low | 6 | 10 | 32% | 3.2 |
| 6 | Low | 8 | 10 | 32% | 3.2 |
| 7 | Low | 10 | 10 | 32% | 3.2 |
| 8 | Low | 13 | 10 | 32% | 3.2 |
| 9 | Low | 16 | 10 | 32% | 3.2 |
| 10 | Low | 20 | 10 | 32% | 3.2 |

TABLE 5

Variable Pulse Burst Sequences - Medium Mode, 32 uS period

| Level | Mode | # of Pulses | Period (uS) | Duty Cycle | Pulse (uS) |
|---|---|---|---|---|---|
| 1 | Medium | 2 | 32 | 10% | 3.2 |
| 2 | Medium | 3 | 32 | 10% | 3.2 |
| 3 | Medium | 4 | 32 | 10% | 3.2 |
| 4 | Medium | 5 | 32 | 10% | 3.2 |
| 5 | Medium | 6 | 32 | 10% | 3.2 |
| 6 | Medium | 8 | 32 | 10% | 3.2 |
| 7 | Medium | 10 | 32 | 10% | 3.2 |
| 8 | Medium | 13 | 32 | 10% | 3.2 |
| 9 | Medium | 16 | 32 | 10% | 3.2 |
| 10 | Medium | 20 | 32 | 10% | 3.2 |

TABLE 6

Variable Pulse Burst Sequences - High Mode, 64 uS period

| Level | Mode | # of Pulses | Period (uS) | Duty Cycle | Pulse (uS) |
|---|---|---|---|---|---|
| 1 | High | 2 | 64 | 5% | 3.2 |
| 2 | High | 3 | 64 | 5% | 3.2 |
| 3 | High | 4 | 64 | 5% | 3.2 |
| 4 | High | 5 | 64 | 5% | 3.2 |
| 5 | High | 6 | 64 | 5% | 3.2 |
| 6 | High | 8 | 64 | 5% | 3.2 |
| 7 | High | 10 | 64 | 5% | 3.2 |
| 8 | High | 13 | 64 | 5% | 3.2 |
| 9 | High | 16 | 64 | 5% | 3.2 |
| 10 | High | 20 | 64 | 5% | 3.2 |

It is noted that Tables 1-6 above are exemplary rather than limiting. A wide variety of numbers of pulses, and timing between pulse bursts, may be implemented to achieve a desired effect. For example, a first pulse within a burst of pulses may have a longer duration than a second pulse or subsequent pulses, to encourage a breakover effect at the electrical contact to skin barrier when in contact with an animal. Further, different pulses within a burst may have different duration. Still further, although not seen in the above tables, different signal amplitudes may be used when the flyback transformer is operated within a linear operating range, adding a further dimension of variability to the electrical stimulus signals generated.

Figure 19:
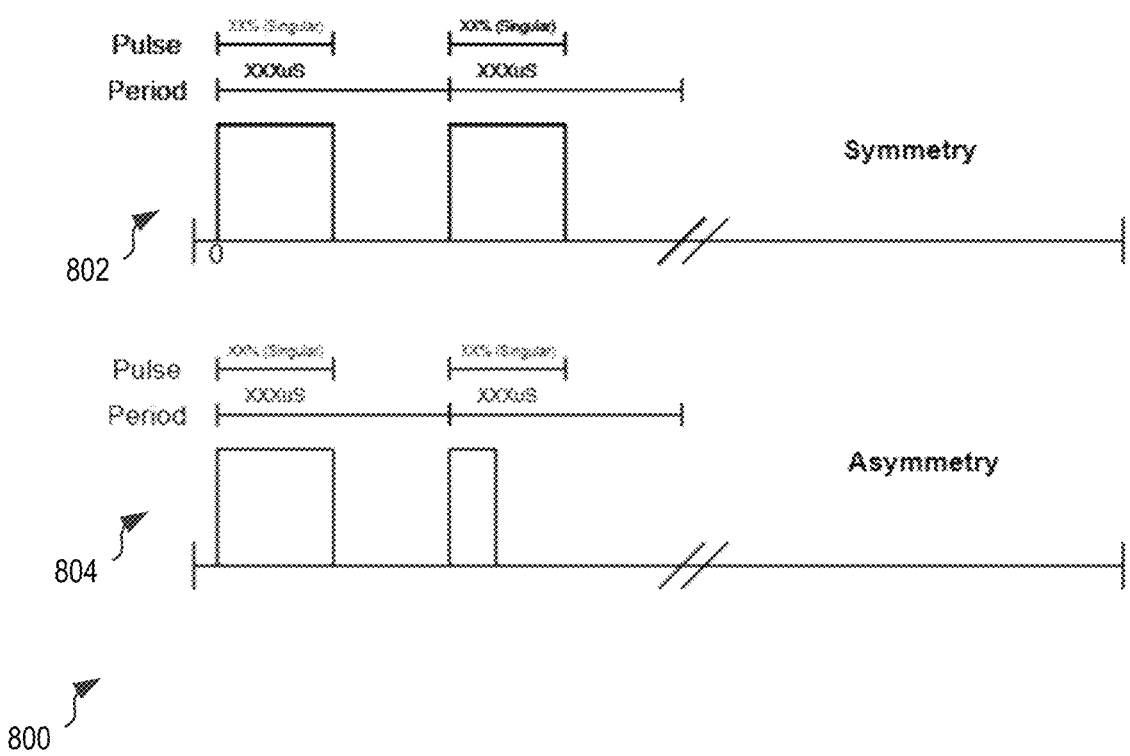
FIG. 19 is a timing diagram of a variable-pulse stimulation signal in accordance with further example implementations, useable to actuate an electrical stimulation circuit as described herein.

Furthermore, as seen in the timing diagram 800 shown in FIG. 19, each pulse included within a pulse burst may be varied in terms of its duration. In particular, as shown in FIG. 18, either symmetric pulses may be used within a particular burst of a predetermined number of pulses, i.e., using a constant pulse and inactivity duty cycle (as seen in signal 802), or asymmetric pulses may be used, with the active portion of a duty cycle varied for each pulse (as seen in signal 804). The duty cycle may be varied, in conjunction with the number of pulses within a given burst, and the amplitude of pulses (e.g., based on use of a linear or saturation region of the flyback transformer), to achieve the desired stimulus effect.

Figure 20:
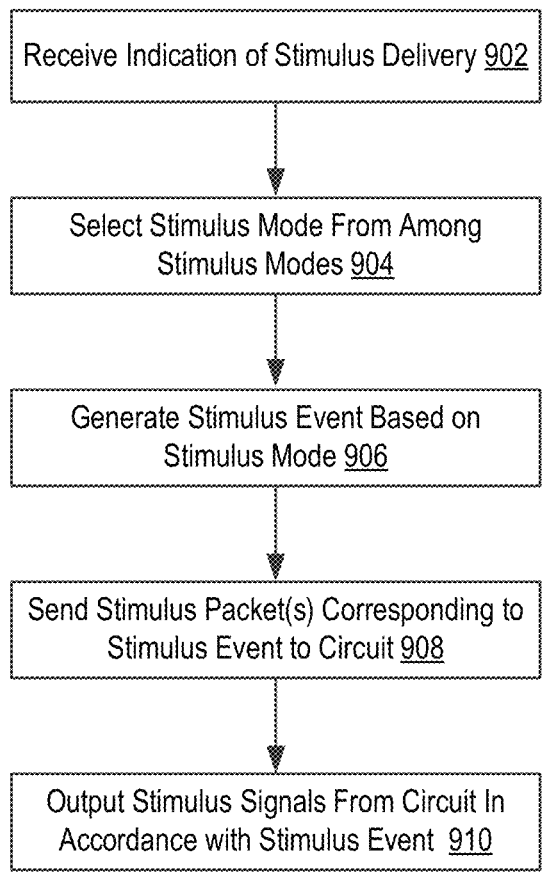
FIG. 20 is a flowchart of an example method of operation of an electrical stimulation system using a variable-pulse stimulation signal to apply an electrical stimulus to an animal, in accordance with an example embodiment.

FIG. 20 is a flowchart of an example method 900 of operation of an electrical stimulation system using a variable-pulse stimulation signal to apply an electrical stimulus to an animal, in accordance with an example embodiment. The method 900 may be performed, for example at least in part by the electrical stimulation system 300 described above in FIG. 13, including any of the circuits useable therein and any variable-pulse signaling schemes described.

In the example shown, the method 900 includes receiving an indication of stimulus delivery (at step 902). The indication of stimulus delivery may be generated at a controller of a system itself (e.g., controller 310), or may be generated externally from the system 300 as shown, and the controller receiving or selecting an indication of an appropriate mode to be used.

In this example, the controller may select a particular stimulus mode that is appropriate for the event sensed (step 904). This may include selecting a particular low, medium, or high stimulus signal in accordance with a preset or selected level of stimulus, with each of the levels and low/medium/high modes being varied based on a number of pulses included in a burst and an amount of time between such bursts. The specific stimulus signal selected, and number of pulses selected, may be in accordance with a selected stimulus mode, for example according to the burst sequences illustrated in Tables 1-6 above, and/or varied as described above in FIG. 18.

In the example shown, the stimulus event may be generated based on the selected stimulus mode (step 906). This stimulus event may be constructed as a stimulus packet (step 908), and can correspond to a data signal provided to an electrical stimulation circuit from a controller having a selected set of pulses, period, and pulse duration, which is then used by the electrical stimulation circuit to generate and output stimulus signals from a flyback transformer to provide an appropriate stimulus signal on stimulus contacts (step 910).

It is noted that, generally speaking, the method 900 may be varied in a number of ways. For example, the manner in which an indication that a stimulus should be generated may vary. Such a stimulus indication signal may be based on one or more internal sensors of a pet collar 10, or may be received via RF transmission, e.g., via a wireless circuit 320 and controller 310 communicating with other receiver/transmitter devices. Additionally, a stimulus mode or level may be preset or partially preset, or may be determined at the time the stimulus event is to be generated. Other variations may occur as well, in accordance with various embodiments of the circuit and stimulus signaling systems described herein.

Referring to FIGS. 21-24, a set of signaling diagrams are illustrated, showing comparative signaling at stimulus contacts of a stimulus circuit of the present disclosure as compared to existing stimulus circuit devices developed by the applicant. The examples depicted herein show different time scales at which the signals generated by respective stimulus circuits may be viewed, and illustrate output using a modeled 10 kiloohm resistance at the stimulus contacts (representative of a load across the stimulus contacts that is typical for use in testing FIGS. 21A and 21B illustrate timing diagrams 1000, 1010, respectively, that depict a stimulation signal output using the circuits and methods of the present disclosure (timing diagram 1000 of FIG. 21A) as compared to an existing stimulus circuit (timing diagram 1010 of FIG. 21B) that utilizes a linear region of a transformer to generate a flyback event and resulting stimulus output. In this example, a burst of pulses are output in a period of approximately 2.4 milliseconds in each case. However, as will be seen in further detail, the period of pulse bursts in the timing diagram 1000 includes a plurality of pulses per signal, as compared to the individual stimulus signals of diagram 1010 (seen more specifically in FIGS. 23A-B and 24A-B). As can be seen specifically in FIGS. 21A-B, the stimulus signals generated by the present stimulus circuit (as in timing diagram 1000) generally remain positive voltage signals, due at least in part to the forward-oriented diode arrangement that is connected between the secondary side of the flyback transformer and the stimulus contacts. By contrast, the stimulus signal previously generated (as in timing diagram 1010) may swing to a negative voltage value as part of the flyback event. Furthermore, while the current circuit generates an event of a constant value below about 250 volts (both in absolute value and peak-to-peak), the previously-generated stimulus signaling may approach or exceed 1 kV peak-to-peak (showing 982.7 volts and 1.125 volts peak-to-peak).

Figure 21A:
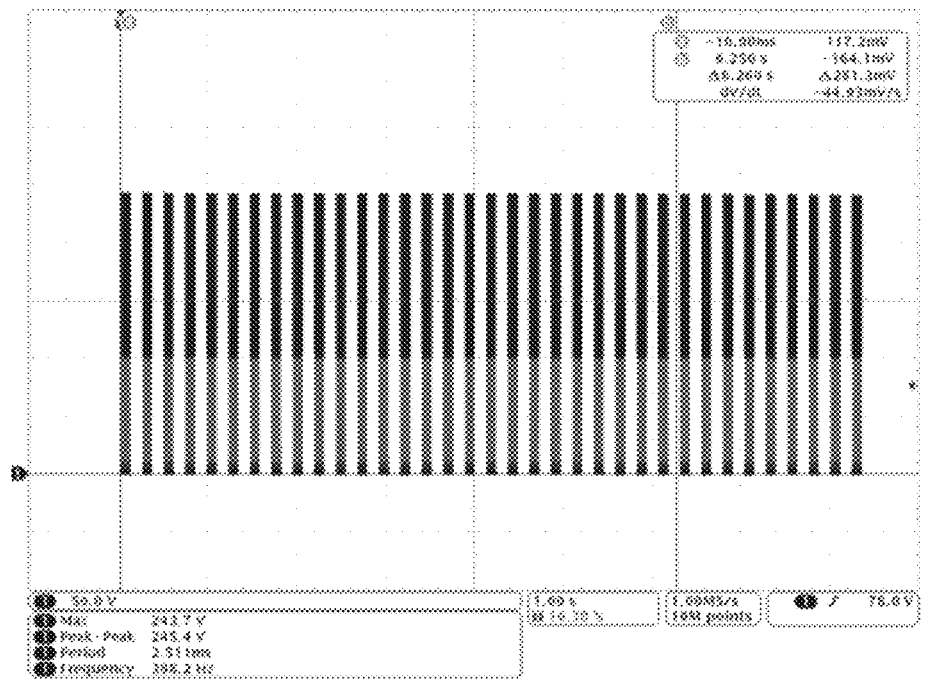
FIGS. 21A-21B illustrate signaling diagrams at one second time scale, showing a stimulation signal of the present disclosure compared to preexisting electrical stimulation signal generation, according to a possible embodiment.
Figure 21B:
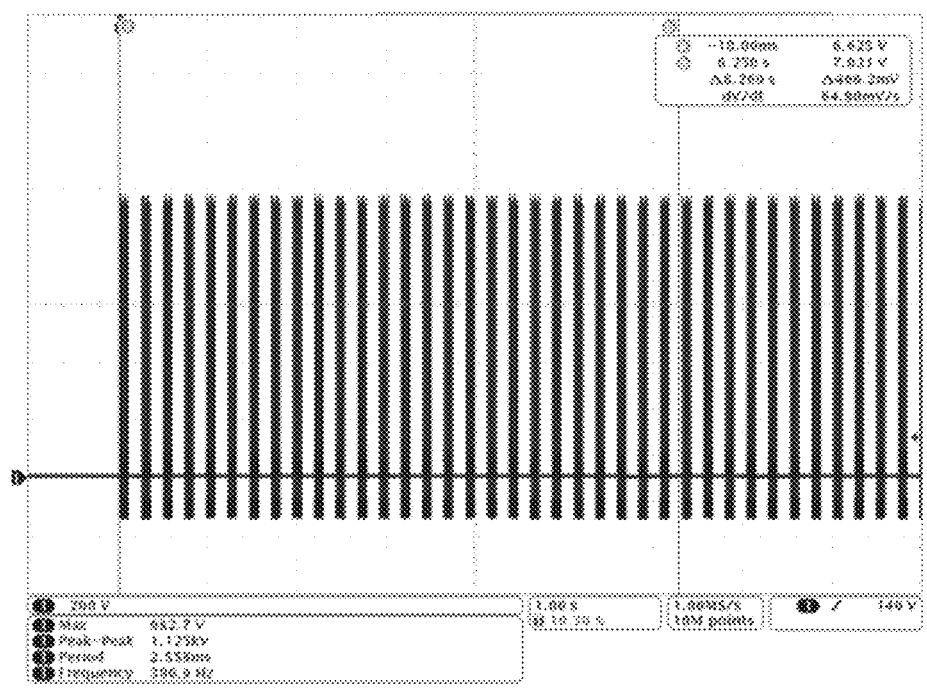
Figure 22A:
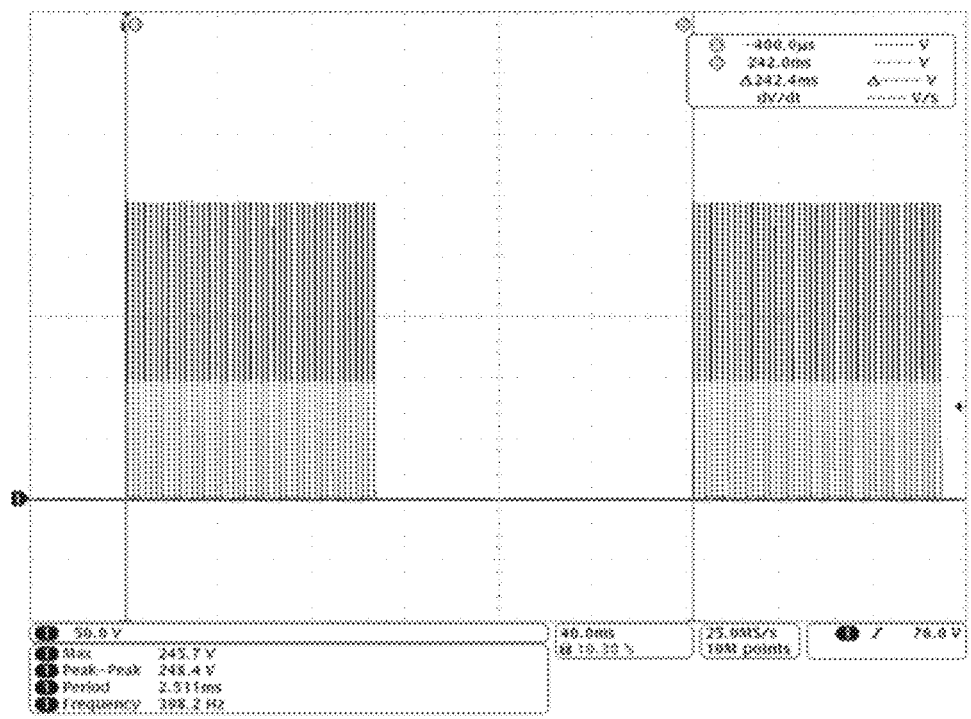
FIGS. 22A-22B illustrate signaling diagrams showing a comparison of the stimulus signals depicted in FIGS. 20A-20B at 40 millisecond time scale.
Figure 22B:
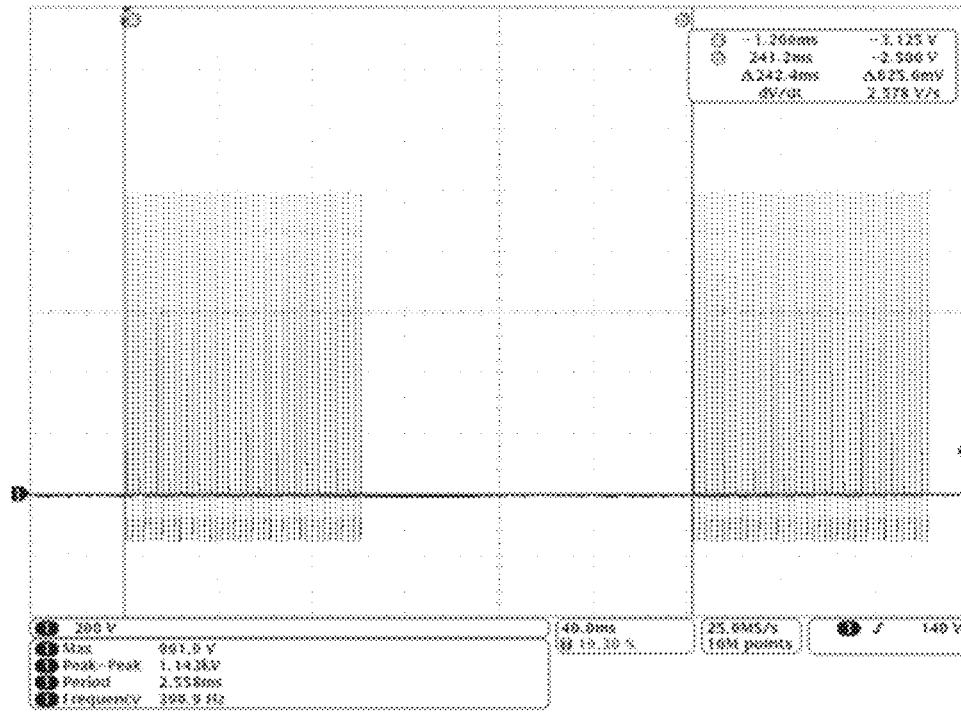

FIGS. 22A-22B illustrate signaling diagrams 1100, 1110, which illustrate, at a 40 millisecond time scale, the comparative signals seen in FIGS. 21A-B. In this example, it can be seen that the stimulus signals generated by the present stimulus circuit (as in timing diagram 1100) may generally actuate in a similar manner to those of the previous circuit (reflected in timing diagram 1110), again at a lower peak, positive voltage. At this time scale, it can begin to be seen that individual "pulses" in the timing diagram 1110 correspond to a more prolonged voltage signal in the timing diagram 1100.

Figure 23A:
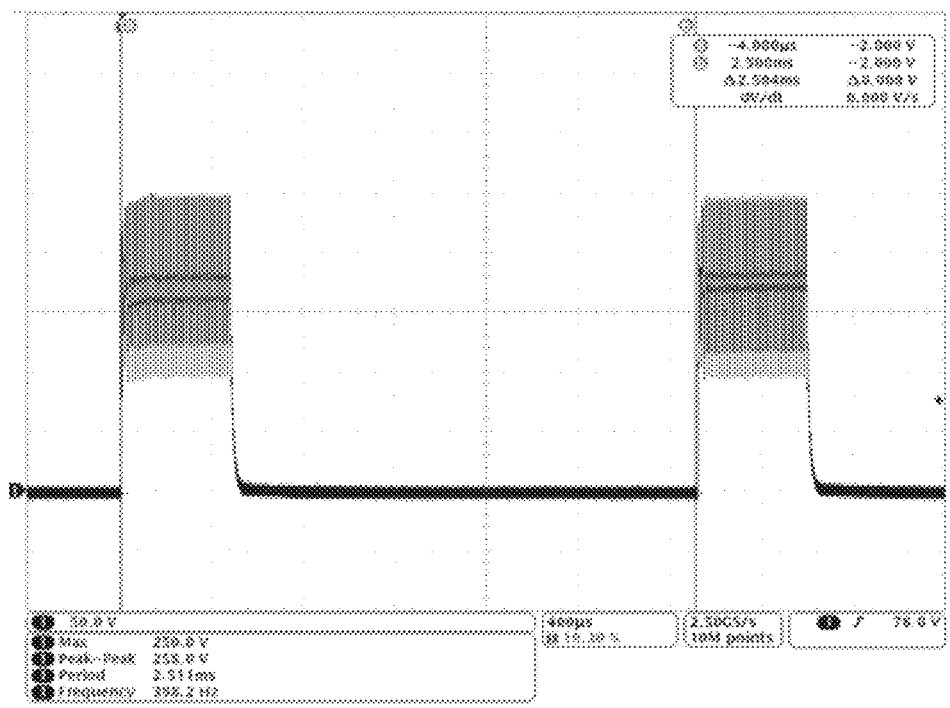
FIGS. 23A-23B illustrate signaling diagrams showing a comparison of the stimulus signals depicted in FIGS. 20A-20B at 400 microsecond time scale.
Figure 23B:
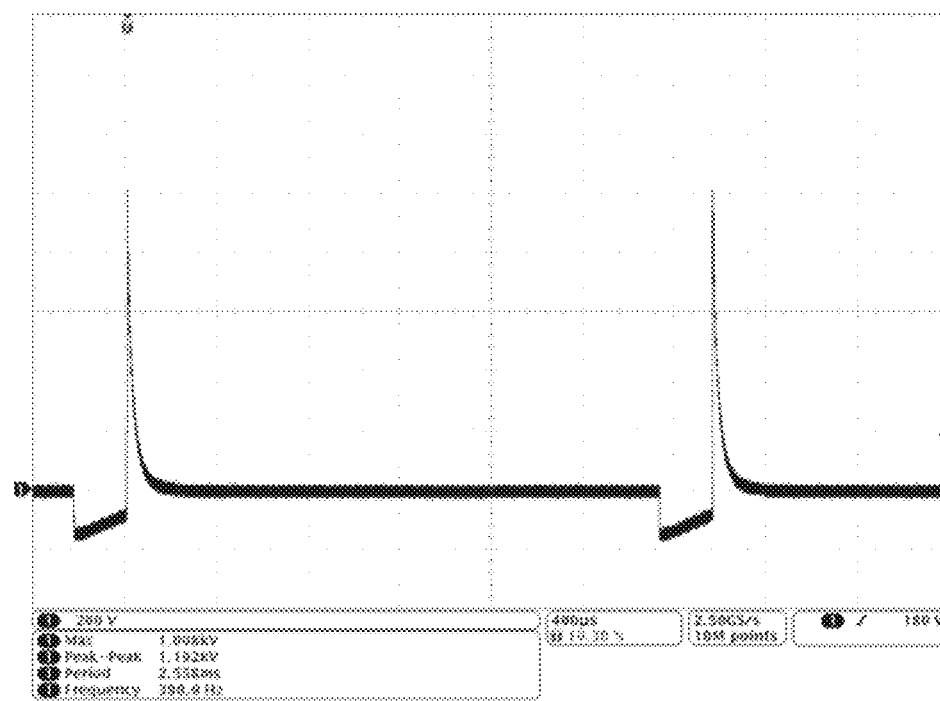
Figure 24A:
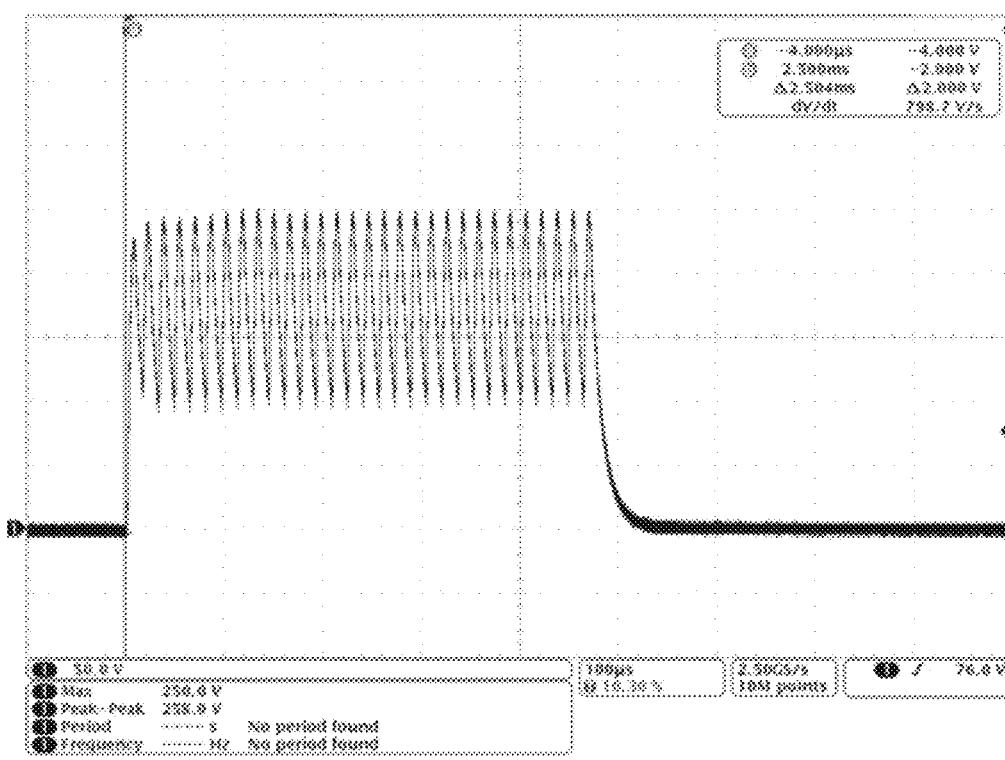
FIGS. 24A-24B illustrate signaling diagrams showing a comparison of the stimulus signals depicted in FIGS. 20A-20B at 100 millisecond time scale.
Figure 24B:
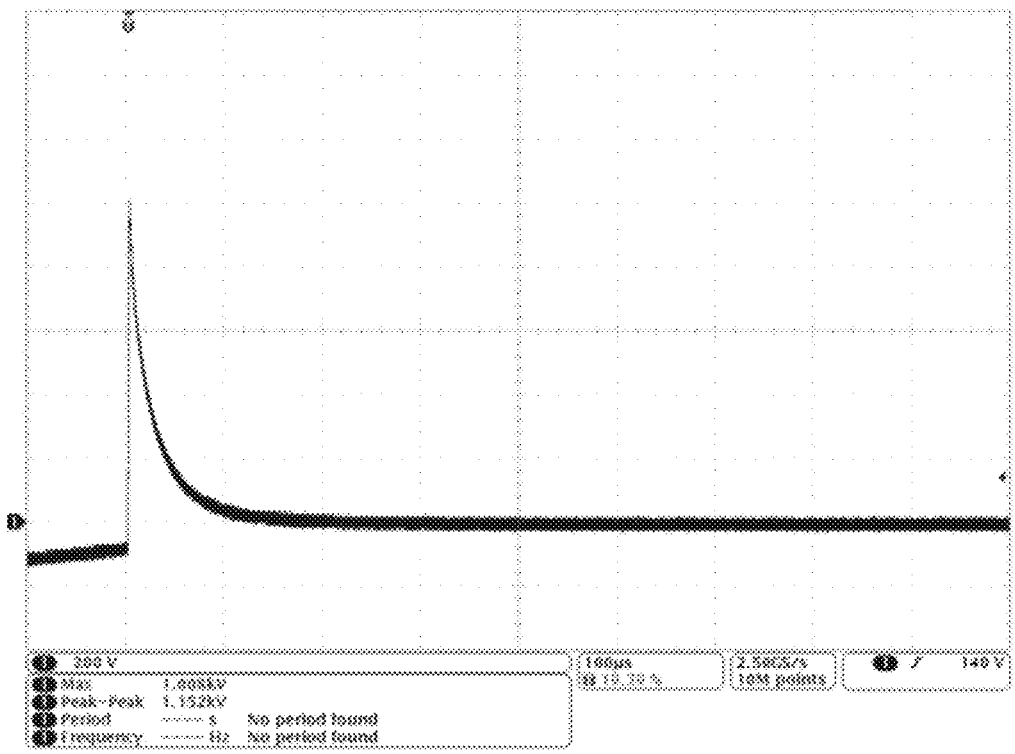

This difference in signaling is more apparent in signaling diagrams of FIGS. 23A-B, at 400 microsecond time scale, and FIGS. 24A-B, at 100 millisecond time scale. In these diagrams, the stimulation signal output using the circuits and methods of the present disclosure (timing diagram 1200 of FIG. 23A and diagram 1300 of FIG. 24A) illustrate a series of discharge events within a given event period, as compared to a single flyback event per period using applicant's prior stimulus circuit (as reflected in timing diagram 1210 of FIG. 23B and timing diagram 1310 of FIG. 24B).

Referring to FIGS. 21A-24A generally, it is noted that these diagrams represent only one example implementation of the signaling scheme provided by the circuit and systems of the present disclosure. For example variants of such systems may utilize a first stimulus pulse that is wider than a second or subsequent pulses to encourage a skin breakover effect to be overcome. Furthermore, although the example provided shows pulses of equal width (duration), it is noted that different pulses within the burst of pulses may have different widths, as discussed above.

Referring to FIGS. 1-24 overall, it is noted that the electrical stimulation system described herein has a number of advantages when implemented within an animal collar or similar devices. For example, as noted above, generally the flyback transformer used in such a system may be smaller, and therefore wearable in a collar by a wide variety of animals of differing sizes. This is due, at least in part, to the smaller flyback energy required for use in conjunction with the bursts of pulses used in the present application. Additionally devices, such as animal collars and mats, that use flyback transformers with a lower flyback energy, as described herein, may have an equivalent stimulus effect to previous devices despite consuming lower energy comparatively, leading to power savings, increased battery life (or greater compactness due to smaller battery requirements) and the like. Additional advantages are also realized, in accordance with the description of the systems and methods described herein.

III. Examples

In accordance with the above description and following claims, a set of examples embodying aspects of this disclosure are as follows.

In Example 1, an electrical stimulus device includes a plurality of stimulus contacts including at least a first stimulus contact and a second stimulus contact, an energy source, and an electrical stimulation circuit. The electrical stimulation circuit includes: a transformer having a primary side and a secondary side, the transformer being connected to the energy source at the primary side, and the secondary side having a first connection and a second connection, wherein the first connection of the secondary side is electrically connected to the first stimulus contact and the second connection of the secondary side is electrically connected to the second stimulus contact; an electrically-operable switch connected at the primary side of the flyback transformer, the electrically-operable switch having a control input useable to actuate the electrically-operable switch to impart an electrical stimulus at the first and second stimulus contacts; a diode electrically connected between the secondary side of the flyback transformer and the first stimulus contact; and a capacitor electrically connected across the first connection and the second connection of the secondary side of the transformer. The electrical stimulus device includes a controller communicatively connected to the control input, the controller being configured to generate an electrical stimulus event at the plurality of stimulus contacts by outputting, to the control input of the electrical stimulation circuit, a stimulus signal pattern.

In Example 2, the electrical stimulus device of Example 1 is provided, wherein the transformer comprises a flyback transformer, and wherein the primary side of the flyback transformer has a first connection and a second connection, the first connection being connected to the energy source.

In Example 3, the electrical stimulus device of Examples 1 or 2 is provided, wherein the electrically-operable switch is connected between the second connection of the primary side of the flyback transformer and a ground connection.

In Example 4, the electrical stimulus device of Example 3 is provided, wherein the control input of the electrically-operable switch is connected to the controller, the controller being configured to actuate the electrically-operable switch between an open position in which the second connection of the primary side of the flyback transformer is disconnected from ground and a closed position in which the second connection of the primary side of the flyback transformer is connected to ground.

In Example 5, the electrical stimulus device of any of Examples 1-4 is provided, wherein the stimulus signal pattern is selected at the controller in accordance with a selected stimulus mode from among a plurality of programmable stimulus modes.

In Example 6, the electrical stimulus device of Example 5 is provided, wherein each of the plurality of programmable stimulus modes includes a definition of a packet, wherein each packet defines a duty cycle including one or more pulse burst periods, each pulse burst period including a plurality of pulses.

In Example 7, the electrical stimulus device of Example 6 is provided, wherein each electrical stimulus event includes one or more packets, wherein each of the plurality of stimulus modes defines a number of packets, a number of bursts, and a number of pulses included within an electrical stimulus event for the corresponding stimulus mode of the plurality of stimulus modes.

In Example 8, the electrical stimulus device of Example 7 is provided, wherein each of the plurality of stimulus modes corresponds to a different, selectable stimulus level delivered by the electrical stimulus device.

In Example 9, the electrical stimulus device of Example 5 is provided, wherein at least one of the plurality of stimulus modes includes a plurality of packets separated by a period of inactivity.

In Example 10, the electrical stimulus device of Example 9 is provided, wherein the period of inactivity is between 1-30 milliseconds.

In Example 11, the electrical stimulus device of any of Examples 1-10 is provided, wherein actuation of the electrically-operable switch in accordance with the stimulus signal pattern charges the transformer to a saturation mode of the transformer.

In Example 12, the electrical stimulus device of any of Examples 1-11 is provided, wherein the electrical stimulus device comprises an animal collar.

In Example 13, the electrical stimulus device of Example 12 is provided, wherein the transformer is positioned within a housing has a volume less than about 1000 cubic millimeters.

In Example 14, the electrical stimulus device of Example 13 is provided, wherein the animal collar includes a housing, the housing enclosing at least the energy source, the electrical stimulation circuit, and the controller.

In Example 15, the electrical stimulus device of Example 14 is provided, wherein the plurality of stimulus contacts are exposed external to the housing.

In Example 16, an electrical stimulation system including an electrical stimulation circuit is provided. The electrical stimulation system includes: a transformer having a primary side and a secondary side, the primary side having a first connection and a second connection, the first connection being connected to an energy source, the secondary side having a first connection and a second connection, wherein the first connection of the secondary side is electrically connected to a first stimulus output connection and the second connection of the secondary side is electrically connected to a second stimulus output connection; an electrically-operable switch connected between the second connection of the primary side of the transformer and a ground connection, the electrically-operable switch having a control input useable to actuate the electrically-operable switch between an open position in which the second connection of the primary side of the transformer is disconnected from ground and a closed position in which the second connection of the primary side of the transformer is connected to ground; a diode electrically connected between the first connection of the secondary side of the transformer and the first stimulus output; and a capacitor electrically connected across the first connection and the second connection of the secondary side of the transformer. The transformer is operable to be energized in response to a pulse sequence received at the control input of the electrically-operable switch comprising a plurality of pulses. A pulse duration of at least some of the plurality of pulses within the burst period operate to charge the transformer to a saturation mode via the energy source.

In Example 17, the electrical stimulation system of Example 16 is provided, wherein the transformer comprises a flyback transformer, and wherein in at least one of the plurality of different stimulus modes, a pulse duration of at least some of the plurality of pulses within a burst period operate to charge the flyback transformer to a linear mode via the energy source.

In Example 18, a method of delivering electrical stimulus to an animal is provided. The method includes determining whether to deliver an electrical stimulus to an animal based, at least in part, on an indicator of a condition received at a controller of an electrical stimulus device; in response to determining to deliver the electrical stimulus, generating an electrical stimulus event at the controller in accordance with a preselected stimulus mode; and, at an electrical stimulation circuit operatively connected to the controller, generating, in response to each of the plurality of pulses, a stimulus signal output from a transformer, the stimulus signal output being electrically provided at a plurality of stimulus contacts positioned to contact a skin surface of an animal, the plurality of stimulus contacts including a first stimulus contact and a second stimulus contact. The electrical stimulation circuit includes a diode electrically connected between the transformer and the first stimulus contact and a capacitor electrically connected across the first stimulus contact and the second stimulus contact.

In Example 19, the method of Example 18 is provided, wherein the transformer comprises a flyback transformer, and wherein the stimulus signal is generated by the flyback transformer operating in a saturation mode.

In Example 20, the method of either of Examples 18-19 is provided, wherein determining whether to deliver an electrical stimulus to the animal is based on at least one of: a determination that the animal has crossed a predetermined barrier; or a determination that the animal has emitted a noise above a predetermined volume threshold.

In Example 21, an animal collar includes a collar portion including a housing portion and at least one extension portion, the at least one extension portion including a wing portion extending from the housing portion. The at least one extension portion includes: an insert received at the wing portion, the insert including a snap receiver aperture having an interior circumferential ridge, the snap receiver aperture extending through the wing portion portion from a first side toward a second side; a strap receiver having a strap insertion slot and a snap fitting, the snap fitting including a cap retention slot and one or more snap extensions positioned to engage the interior circumferential ridge of the snap receiver aperture when the snap fitting is inserted into the snap receiver aperture from the first side; and a retention cap insertable into the snap receiver aperture from the second side, the retention cap including at least one cap retention extension mateable with the cap retention slot and at least one cap extension positioned adjacent the one or more snap extensions, and on an opposite side of the one or more snap extensions from the interior circumferential ridge.

In Example 22, the animal collar of Example 21 is provided, further comprising a flexible strap affixed to the collar portion at the strap insertion slot.

In Example 23, the animal collar of Examples 21 or 22 is provided, wherein the housing portion includes a plurality of stimulus contacts on a rear side of the housing portion and an interior volume retaining an electrical stimulation circuit.

In Example 24, the animal collar of Example 23 is provided, wherein the electrical stimulation circuit is electrically connected to the plurality of stimulus contacts.

In Example 25, the animal collar of Example 24 is provided, further comprising a rechargeable battery electrically connected to the electrical stimulation circuit, the housing portion including a plurality of charging contacts.

In Example 26, the animal collar of Example 25 is provided, wherein the rear side of the housing portion corresponds to the first side of the wing portion and a front side of the housing portion corresponds to the second side of the wing portion.

In Example 27, the animal collar of Example 23 is provided, wherein the rear side of the housing portion corresponds to the first side of the wing portion and a front side of the housing portion corresponds to the second side of the wing portion.

In Example 28, the animal collar of Example 23 is provided, wherein the plurality of stimulus contacts on the rear side of the housing portion extend from the rear side of the housing portion.

In Example 29, the animal collar of any of Examples 21-28 is provided, wherein the at least one extension portion includes a plurality of extension portions including a first extension portion and a second extension portion extending from opposite sides of the housing portion.

In Example 30, the animal collar of any of Examples 21-29 is provided, wherein the housing portion is constructed from an elastomeric material.

In Example 31, the animal collar of any of Examples 21-30 is provided, wherein the retention cap encloses the snap receiver aperture from the second side.

In Example 32, the animal collar of any of Examples 21-31 is provided, wherein the wing portion is integrally formed with the housing portion.

In Example 33, an animal collar includes a housing portion having a front side and a rear side, the housing portion enclosing an electrical stimulation circuit and including a plurality of stimulus contacts exposed at the rear side, as well as a plurality of extension portions including a first extension portion and a second extension portion extending from opposite lateral sides of the housing portion. Each of the first extension portion and the second extension portion includes: a wing portion extending from and integrally formed with the housing portion; an insert received at an end of the wing portion and including a snap receiver aperture extending through the wing portion from a first side toward a second side; a strap receiver having a strap insertion slot and a snap fitting, the strap receiver being insertable at the first side of the snap receiver aperture; and a retention cap insertable into the snap receiver aperture from the second side and mateable with the strap receiver within the snap receiver aperture.

In Example 34, the animal collar of Example 33 is provided, wherein the insert includes an interior circumferential ridge.

In Example 35, the animal collar of Example 34 is provided, wherein the snap fitting includes a cap retention slot and one or more snap extensions positioned to engage the interior circumferential ridge of the snap receiver aperture when the snap fitting is inserted into the snap receiver aperture from the first side.

In Example 36, the animal collar of Example 35 is provided, wherein the retention cap includes at least one cap retention extension mateable with the cap retention slot and at least one cap extension positioned adjacent the one or more snap extensions, and on an opposite side of the one or more snap extensions from the interior circumferential ridge.

In Example 37, the animal collar of any of Examples 33-36 is provided, wherein the housing portion is constructed from an elastomeric material.

In Example 38, the animal collar of any of Examples 33-37 is provided, further comprising a nylon strap received at the strap insertion slot.

In Example 39, the animal collar of any of Examples 33-38 is provided, further comprising a rechargeable battery electrically connected to the electrical stimulation circuit and positioned within the housing portion, the housing portion including a plurality of charging contacts positioned at the rear side.

In Example 40, the animal collar of any of Examples 33-39 is provided, wherein the strap receiver and the retention cap are separable from the wing portion and insert.

In Example 41, an electrical stimulus device includes: a housing: a plurality of stimulus contacts including at least a first stimulus contact and a second stimulus contact; an energy source maintained within the housing; a controller having a plurality of programmable stimulus modes; and an electrical stimulation circuit. The electrical stimulus circuit includes: a flyback transformer having a primary side and a secondary side, the primary side having a first connection and a second connection, the first connection being connected to the energy source, the secondary side having a first connection and a second connection, wherein the first connection of the secondary side is electrically connected to the first stimulus contact and the second connection of the secondary side is electrically connected to the second stimulus contact; and an electrically-operable switch connected between the second connection of the primary side of the flyback transformer and a ground connection, the electrically-operable switch having a control input useable to actuate the electrically-operable switch between an open position in which the second connection of the primary side of the flyback transformer is disconnected from ground and a closed position in which the second connection of the primary side of the flyback transformer is connected to ground. The controller is communicatively connected to the control input, the controller being configured to generate an electrical stimulus event at the plurality of stimulus contacts by outputting, to the control input of the electrical stimulation circuit, a stimulus signal pattern in accordance with a selected stimulus mode from among the plurality of programmable stimulus modes. Each of the plurality of programmable stimulus modes includes a definition of a packet, wherein each packet defines a duty cycle including one or more pulse burst periods, each pulse burst period including a plurality of pulses.

In Example 42, the electrical stimulus device of Example 41 is provided, wherein the electrical stimulation circuit further includes: a diode electrically connected between the first connection of the secondary side of the flyback transformer and the first stimulus contact; and a capacitor electrically connected across the first connection and the second connection of the secondary side of the flyback transformer.

In Example 43, the electrical stimulus device of either of Examples 41 or 42 is provided, wherein each electrical stimulus event includes one or more packets, wherein each of the plurality of stimulus modes defines a number of packets, a number of bursts, and a number of pulses included within an electrical stimulus event for the corresponding stimulus mode of the plurality of stimulus modes.

In Example 44, the electrical stimulus device of Example 43 is provided, wherein each of the plurality of stimulus modes corresponds to a different, selectable stimulus level delivered by the electrical stimulus device.

In Example 45, the electrical stimulus device of any of Examples 41-44 is provided, wherein each pulse of the plurality of pulses charges the flyback transformer to a saturation mode of the flyback transformer.

In Example 46, the electrical stimulus device of any of Examples 41-45 is provided, wherein the electrical stimulus device comprises an animal collar.

In Example 47, the electrical stimulus device of any of Examples 41-446 is provided wherein the energy source comprises a rechargeable battery.

In Example 48, the electrical stimulus device of Example 47 is provided, wherein the plurality of stimulus contacts extend from a first side of the housing, the electrical stimulus device further including a power button and one or more data contacts on the first side of the housing.

In Example 49, the electrical stimulus device of Example 48 is provided, wherein the one or more data contacts includes one or more recharging contacts configured to deliver electrical energy to the rechargeable battery.

In Example 50, the electrical stimulus device of any of Examples 41-49 is provided, wherein at least one of the plurality of stimulus modes includes a plurality of packets separated by a period of inactivity.

In Example 51, the electrical stimulus device of Example 50 is provided, wherein the period of inactivity is between 1-30 milliseconds.

In Example 52, the electrical stimulus device of any of Examples 41-51 is provided, wherein each pulse within the plurality of pulses across the one or more pulse burst periods included in a packet has a constant pulse duration.

In Example 53 the electrical stimulus device of any of Examples 41-52 is provided, wherein the controller is configured to determine whether to deliver the electrical stimulus event in response to one or more inputs, the controller further being configured to generate the electrical stimulus in response thereto.

In Example 54, an electrical stimulation system including an electrical stimulation circuit is provided. The electrical stimulation system includes a flyback transformer having a primary side and a secondary side, the primary side having a first connection and a second connection, the first connection being connected to an energy source, the secondary side having a first connection and a second connection, wherein the first connection of the secondary side is electrically connected to a first stimulus output connection and the second connection of the secondary side is electrically connected to a second stimulus output connection; an electrically-operable switch connected between the second connection of the primary side of the flyback transformer and a ground connection, the electrically-operable switch having a control input useable to actuate the electrically-operable switch between an open position in which the second connection of the primary side of the flyback transformer is disconnected from ground and a closed position in which the second connection of the primary side of the flyback transformer is connected to ground; a diode electrically connected between the first connection of the secondary side of the flyback transformer and the first stimulus output; and a capacitor electrically connected across the first connection and the second connection of the secondary side of the flyback transformer. The flyback transformer is operable to be energized in response to a pulse sequence received at the control input of the electrically-operable switch comprising a plurality of pulses occurring within a burst period, wherein each pulse corresponds to a flyback event of the flyback transformer. A pulse duration of at least some of the plurality of pulses within the burst period operate to charge the flyback transformer to a saturation mode via the energy source.

In Example 55, the electrical stimulation system of Example 54 is provided, wherein the flyback transformer is selected to operate within a saturation mode in response to the electrically-operable switch connecting the second connection of the primary side of the flyback transformer to ground.

In Example 56, the electrical stimulation system of Example 54 or 55 is provided, further comprising a controller operatively connected to the electrically-operable switch at the control input, the controller being configured to generate, at the control input, an electrical stimulus event comprising a packet including one or more pulse burst periods and an inactivity period, the one or more pulse burst periods including a plurality of pulses.

In Example 57, the electrical stimulation system of Example 56 is provided, wherein the controller is configured to deliver an electrical stimulus event in accordance with a plurality of different stimulus modes.

In Example 58, the electrical stimulation system of Example 57 is provided, wherein each of the plurality of different stimulus modes includes a different number or frequency of pulses.

In Example 59, the electrical stimulation system of Example 57 is provided, wherein in at least one of the plurality of different stimulus modes, a pulse duration of at least some of the plurality of pulses within a burst period operate to charge the flyback transformer to a linear mode via the energy source.

In Example 60, a method of delivering electrical stimulus to an animal includes: determining whether to deliver an electrical stimulus to an animal based, at least in part, on an indicator of a condition received at a controller of an electrical stimulus device; in response to determining to deliver the electrical stimulus, generating an electrical stimulus event at the controller in accordance with a preselected stimulus mode, the electrical stimulus event comprising one or more packets, each packet defining a duty cycle including a burst period and an inactivity period, wherein the burst period includes a plurality of pulses; at an electrical stimulation circuit operatively connected to the controller, generating, in response to each of the plurality of pulses, a corresponding stimulus signal output from a flyback transformer to a plurality of stimulus contacts positioned to contact a skin surface of an animal.

While particular uses of the technology have been illustrated and discussed above, the disclosed technology can be used with a variety of devices in accordance with many examples of the technology. The above discussion is not meant to suggest that the disclosed technology is only suitable for implementation with the specific collar structure or circuitry shown and described above. For example, while certain technologies described herein were primarily described in the context of an animal collar and use of a specific type of transformer and associated circuit, aspects of the present disclosure are not so limited.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. An animal collar comprising:
a collar portion including a housing portion and at least one extension portion, the at least one extension portion including a wing portion extending from the housing portion, the at least one extension portion further including:
an insert received at the wing portion, the insert including a snap receiver aperture having an interior circumferential ridge, the snap receiver aperture extending through the wing portion from a first side toward a second side;
a strap receiver having a strap insertion slot and a snap fitting, the snap fitting including a cap retention slot and one or more snap extensions positioned to engage the interior circumferential ridge of the snap receiver aperture when the snap fitting is inserted into the snap receiver aperture from the first side;
a retention cap insertable into the snap receiver aperture from the second side, the retention cap including at least one cap retention extension mateable with the cap retention slot and at least one cap extension positioned adjacent the one or more snap extensions, and on an opposite side of the one or more snap extensions from the interior circumferential ridge.

2. The animal collar of claim 1, further comprising a flexible strap affixed to the collar portion at the strap insertion slot.

3. The animal collar of claim 1, wherein the housing portion includes a plurality of stimulus contacts on a rear side of the housing portion and an interior volume retaining an electrical stimulation circuit.

4. The animal collar of claim 3, wherein the electrical stimulation circuit is electrically connected to the plurality of stimulus contacts.

5. The animal collar of claim 4, further comprising a rechargeable battery electrically connected to the electrical stimulation circuit, the housing portion including a plurality of charging contacts.

6. The animal collar of claim 5, wherein the rear side of the housing portion corresponds to the first side of the wing portion and a front side of the housing portion corresponds to the second side of the wing portion.

7. The animal collar of claim 3, wherein the plurality of stimulus contacts on the rear side of the housing portion extend from the rear side of the housing portion.

8. The animal collar of claim 1, further comprising data contacts useable for data communication with a controller included in the electrical stimulation circuit.

9. The animal collar of claim 1, wherein the at least one extension portion includes a plurality of extension portions including a first extension portion and a second extension portion extending from opposite sides of the housing portion.

10. The animal collar of claim 1, wherein the housing portion is constructed from an elastomeric material.

11. The animal collar of claim 1, wherein the retention cap encloses the snap receiver aperture from the second side.

12. The animal collar of claim 1, wherein the wing portion is integrally formed with the housing portion.

13. An animal collar comprising:
a housing portion having a front side and a rear side, the housing portion enclosing an electrical stimulation circuit and including a plurality of stimulus contacts exposed at the rear side;
a plurality of extension portions including a first extension portion and a second extension portion extending from opposite lateral sides of the housing portion, wherein each of the first extension portion and the second extension portion includes:
a wing portion extending from and integrally formed with the housing portion;
an insert received at an end of the wing portion and including a snap receiver aperture extending through the wing portion from a first side toward a second side;
a strap receiver having a strap insertion slot and a snap fitting, the strap receiver being insertable at the first side of the snap receiver aperture; and
a retention cap insertable into the snap receiver aperture from the second side and mateable with the strap receiver within the snap receiver aperture.

14. The animal collar of claim 13, wherein the insert includes an interior circumferential ridge.

15. The animal collar of claim 14, wherein the snap fitting includes a cap retention slot and one or more snap extensions positioned to engage the interior circumferential ridge of the snap receiver aperture when the snap fitting is inserted into the snap receiver aperture from the first side.

16. The animal collar of claim 15, wherein the retention cap includes at least one cap retention extension mateable with the cap retention slot and at least one cap extension positioned adjacent the one or more snap extensions, and on an opposite side of the one or more snap extensions from the interior circumferential ridge.

17. The animal collar of claim 13, wherein the housing portion is constructed from an elastomeric material.

18. The animal collar of claim 13, further comprising a nylon strap received at the strap insertion slot.

19. The animal collar of claim 13, further comprising a rechargeable battery electrically connected to the electrical stimulation circuit and positioned within the housing portion, the housing portion including a plurality of charging contacts positioned at the rear side.

20. The animal collar of claim 13, wherein the strap receiver and the retention cap are separable from the wing portion and insert.

* * * * *